United States Patent
Patchett et al.

(10) Patent No.: US 7,150,145 B2
(45) Date of Patent: *Dec. 19, 2006

(54) CONTROL SYSTEM FOR MOBILE NOX SCR APPLICATIONS

(75) Inventors: Joseph A. Patchett, Basking Ridge, NJ (US); Rudolfus Petrus Verbeek, Naaldwijk (NL); Karl Richard Grimston, Upper Stensham (GB); Gary Wayne Rice, Scotch Plains, NJ (US); John Lawrence Calabrese, Summit, NJ (US); Mathus Van Genderen, Delft (NL)

(73) Assignee: Engelhard Corporation, Iselin, NJ (US)

( * ) Notice: Subject to any disclaimer, the term of this patent is extended or adjusted under 35 U.S.C. 154(b) by 308 days.

This patent is subject to a terminal disclaimer.

(21) Appl. No.: 10/740,119

(22) Filed: Dec. 17, 2003

(65) Prior Publication Data
US 2004/0128982 A1    Jul. 8, 2004

(51) Int. Cl.
*F01N 3/00* (2006.01)
(52) U.S. Cl. ............ 60/286; 60/274; 60/276; 60/285; 60/295; 60/303; 701/112
(58) Field of Classification Search ............ 60/274, 60/276, 277, 286, 285, 295, 297, 303; 701/102, 701/112, 113
See application file for complete search history.

(56) References Cited

U.S. PATENT DOCUMENTS

| | | | |
|---|---|---|---|
| 4,188,364 A | 2/1980 | Gladden | |
| 4,314,345 A | 2/1982 | Shiraishi et al. | |
| 4,403,473 A | 9/1983 | Gladden | |
| 4,473,536 A | 9/1984 | Carberg et al. | |
| 4,751,054 A | 6/1988 | Watanabe | |
| 4,961,917 A | 10/1990 | Byrne | |
| 4,963,332 A | 10/1990 | Brand et al. | |
| 5,024,981 A | 6/1991 | Speronello et al. | |
| 5,047,220 A | 9/1991 | Polcer | |
| 5,116,579 A | 5/1992 | Kobayashi et al. | |
| 5,319,921 A | 6/1994 | Gopp | |
| 5,490,064 A | 2/1996 | Minowa et al. | |
| 5,513,522 A * | 5/1996 | Seki et al. ............. | 73/118.1 |
| 5,516,497 A | 5/1996 | Speronello et al. | |
| 5,522,218 A | 6/1996 | Lane et al. | |

(Continued)

OTHER PUBLICATIONS

SAE paper No. 921673 entitled "Development of an Ammonia/SCR NOx Reduction System for a Heavy Duty Natural Gas Engine" by J. Walker and D. K. Speronello, Sep. 14-17, 1992*.

(Continued)

*Primary Examiner*—Binh Q. Tran
(74) *Attorney, Agent, or Firm*—Richard A. Negin

(57) ABSTRACT

A diesel powered vehicle is provided with an SCR system which uses an external reducing reagent to convert NOx emissions in a manner which accounts for the effects of NOx transient emissions on the reducing catalyst. Actual NOx emissions produced by the engine are filtered using a variable NOx time constant in turn correlated to the reductant/NOx storage capacity of the reducing catalyst at its current temperature to account for changes in the SCR system attributed to NOx transient emissions. Catalyst temperature is filtered using a variable catalyst time constant corresponding to current space velocity of the exhaust gas to account for changes in the catalyst temperature attributed to NOx transient emissions. The reductant is metered on the basis of the filtered, corrected NOx concentration applied at a NSR ratio based, in turn, on the filtered, corrected reducing catalyst temperature.

12 Claims, 10 Drawing Sheets

U.S. PATENT DOCUMENTS

| | | | |
|---|---|---|---|
| 5,606,855 | A | 3/1997 | Tomisawa |
| 5,628,186 | A | 5/1997 | Schmelz |
| 5,643,536 | A | 7/1997 | Schmelz |
| 5,785,937 | A | 7/1998 | Neufert et al. |
| 5,833,932 | A | 11/1998 | Schmelz |
| 5,842,341 | A | 12/1998 | Kibe |
| 5,845,487 | A * | 12/1998 | Fraenkle et al. ............ 60/274 |
| 5,948,723 | A | 9/1999 | Sung |
| 5,974,794 | A | 11/1999 | Gotoh et al. |
| 5,996,338 | A | 12/1999 | Hirota |
| 6,026,793 | A | 2/2000 | Yasui et al. |
| 6,073,073 | A | 6/2000 | Kitamura et al. |
| 6,119,448 | A | 9/2000 | Emmerling et al. |
| 6,167,698 | B1 | 1/2001 | King et al. |

OTHER PUBLICATIONS

SAE paper No. 925022 entitled "Catalytic Reduction of NOx in Diesel Exhaust" by S. Lepperhoff, S. Huthwohl and F. Pischinger, Mar. 1992*.

SAE paper No. 930363 ntitled "Off-Highway Exhaust Gas After-Treatm nt: Combining Urea-SCR, Oxidation Catalysis and Traps" by H. T. Hug, A. Mayer and A. Hartenstein, Mar. 1-5, 1993*.

SAE paper No. 952493 entitled "An Urea Lean NOx Catalyst System for Light Duty Diesel Vehicles" by H. Luders, R. Backes, G. Huthwohl, D.A. Ketcher, R.W. Horrocks, R. G. Hurley and R.H. Hammerle, Oct. 16-19, 1995*.

SAE paper No. 970185 entitled "Transient Performance of a Urea deNOx Catalyst for Low Emmissions Heavy-Duty Diesel Engines" by Dr. C. Havenith and R. P. Verbeek, Feb. 24-27, 1997*.

Paper entitled "NOx—Reduction in Diesel Exhaust Gas with Urea and Selective Catalytic Reduction" by M. Koebel, M. Elsener and T. Marti, *Combustion Science and Technology*, vol. 121, pp. 85-102, 1996*.

Paper entitled "NOx Removal with Combined Selective Catalytic Reduction and Selective Noncatalytic Reduction: Pilot-Scale Test Results" by B.K. Gullett, P.W. Groff, M. Linda Lin and J.M. Chen, Oct. 1994 issue of *Journal of Air & Waste Management Association*, pp. 1188-1194*.

Paper entitled "Pilot-Scale Testing of NOx Removal with Combined Selective Catalytic Reduction and Selective Non-Catalytic Reduction", 1993 Joint EPA/EPRI symposium on Stationary Combustion NOx Control, Bal Harbour, FL*.

* cited by examiner

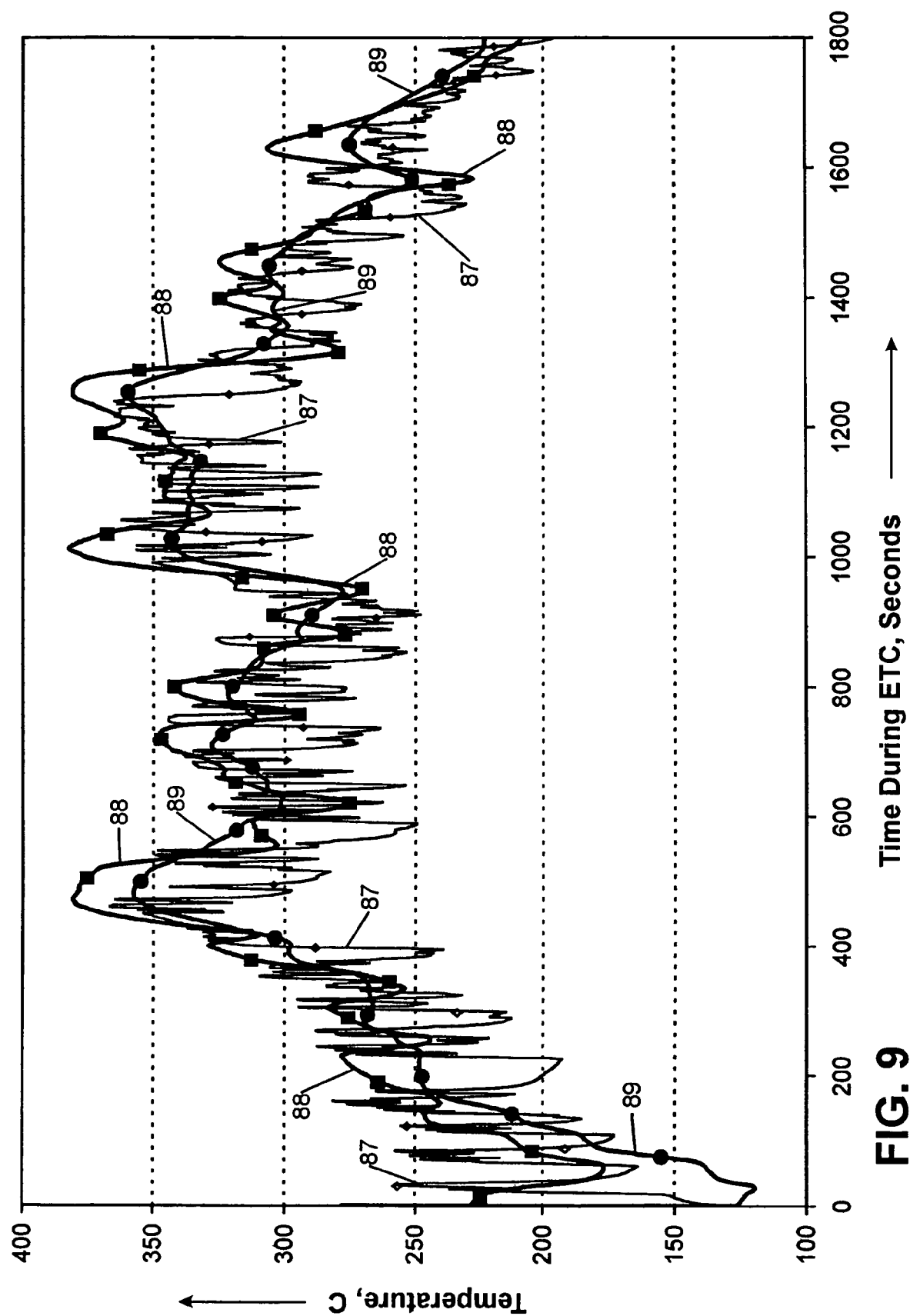

CONTROL SYSTEM FOR MOBILE NOX SCR APPLICATIONS

This invention relates generally to nitrogen oxide (NOx) emissions produced by internal combustion engines in a vehicle and more particularly to a system for controlling reduction of the NOx emissions by means of a selective catalytic reduction (SCR) method.

The invention is particularly applicable to and will be described with specific reference to a control system for regulating the supply of an external reductant, ammonia, to a reducing catalyst in an SCR system taking into account the effect of NOx transient emissions produced in vehicles powered by diesel engines. However, those skilled in the art will recognize that the control system has broader applications and may be applied to SCR systems using other reductants such as fuel oil or hydrocarbons as well as SCR systems used in other mobile internal combustion engine applications, such as gasoline engines employing "lean burn" techniques.

INCORPORATION BY REFERENCE

The following patents and publications are incorporrated by reference herein and made a part hereof:
1) U.S. Pat. No. 4,403,473, to John R. Gladden; dated Sep. 13, 1983, entitled: "AMMONIA/FUEL RATIO CONTROL SYSTEM FOR REDUCING NITROGEN OXIDE EMISSIONS";
2) SAE Paper No. 952493, by H. Luders, R. Backes, and G. Huthwohl, FEV Motoremtechnik and D. A. Ketcher, R. W. Horrocks, R. G. Hurley and R. H. Hammerle, Ford Motor Co., dated Oct. 16–19, 1995, entitled: "AN UREA LEAN NOx CATALYST SYSTEM FOR LIGHT DUTY DIESEL VEHICLES" (See page 7);
3) SAE Paper No. 921673, by J. Walker, Ortech and B. K. Speronello, Engelhard Corp., dated Sep. 14–17, 1992, entitled: "DEVELOPMENT OF AN AMMONIA/SCR NOx REDUCTION SYSTEM FOR A HEAVY DUTY NATURAL GAS ENGINE";
4) U.S. Pat. No. 5,606,855, to Naoki Tomisawa, dated Mar. 4, 1997, entitled: "APPARATUS AND METHOD FOR ESTIMATING THE TEMPERATURE OF AN AUTOMOTIVE CATALYTIC CONVERTER"; and,
5) U.S. Pat. No. 5,490,064, to Minowa et al., dated Feb. 6, 1996, entitled: "CONTROL UNIT FOR VEHICLE AND TOTAL CONTROL SYSTEM THEREFOR".

None of the material cited above form any part of the present invention. The material is incorporated by reference herein so that details relating to SCR systems such as the operation of the SCR systems with ammonia or hydrocarbon reductants, the metering, of the reductants, principles and control of engine operation etc., need not be set forth or described in detail herein.

BACKGROUND

This invention is directed to the removal of nitrogen oxides (NOx) from the exhaust gases of internal combustiobn engine, particularly diesel engines, which operate at combustion conditions with air in large excess of that required for stoichiometric combustion, i.e., lean. Unfortunately, the presence of excess air makes the catalytic reduction of nitrogen oxides difficult. Emission regulations impose a limit on the quantity of specific emissions, including NOx, that a vehicle can emit during a specified drive cycle, such as i) for light duty trucks, an FTP ("federal test procedure") in the United States or an MVEG ("mobie vehicle emissions group") in Europe or ii) for heavy duty trucks, a Heavy Duty Cycle in the United States or an ESC (European Steady State Cycle) or ETC (European Transient Cycle) in Europe. The regulations are increasingly limiting the amount of nitrogen oxides that can be emitted during the regulated drive cycle.

There are numerous ways known in the art to remove NOx from a waste gas. This invention is directed to a catalytic reduction method for removing NOx. A catalytic reduction method essentially comprises passing the exhaust gas over a catalyst bed in the presence of a reducing gas to convert the NOx into nitrogen. Conventionally, there are three ways to treat vehicular exhaust to reduce NOx. The first method is non-selective catalyst reduction (NSCR). The second way is selective non-catalytic reduction (SNCR) and the last method is selective catalytic reduction (SCR). This invention relates to SCR systems.

In diesel engines, sufficient NOx reduction to meet current regulations has been achieved by combustion modifications in the diesel engine by, for example, incorporating EGR. Projected emission levels are such that combustion and engine modifications will not be sufficient to meet the more stringent levels. Because of excess oxygen present in diesel exhaust gases, the opportunity for NOx reduction under rich or stoichiometric air/fuel is not possible. SCR is a technology that has been shown effective in removing NOx from oxygen rich exhaust. A number of SCR systems have been developed which, because of infrastructure concerns, have used diesel fuel or diesel oil as the reductant source. Unfortunately, as of this date, an HC reducing catalyst has not yet been developed which has sufficient activity and is effective over the entire operating range of the diesel engine.

A common nitrogen oxide reducing agent, long used in industrial processes, is ammonia. NOx reducing catalysts have been developed which are effective over the operating range of the engine. Despite the infrastructure concerns relating to the use of urea in a mobile application as well as the potentially dangerous risks of ammonia break-through or slip, ammonia SCR systems are becoming the favored choice for mobile applications to meet the more stringent NOx emissions. This is, among other reasons, because of the high NOx conversion percentages possible with ammonia coupled with the ability to optimize the combustion process for maximum power output with minimum fuel consumption.

Notwithstanding what may be said to be inherent advantages of an ammonia based SCR system, the control systems to date have been excessively complicated and/or ineffective to control the SCR system when the impact of NOx transient emissions on the SCR system is considered. As will be shown below, if the transient NOx emissions can not be adequately reduced by the SCR control system, then stringent NOx emission regulations will not be met.

Early patents controlled ammonia metering by considering the emissions to be controlled at steady state conditions. For example, U.S. Pat. No. 4,403,473 to Gladden (Sep. 13, 1983) considered NOx emissions at various speed ranges and concluded that a linear relationship exists between fuel flow and NOx. (Earlier Gladden U.S. Pat. No. 4,188,364, Feb. 12, 1980 concluded that ammonia catalyst adsorbed ammonia at temperatures lower than 200° C. and desorbed at temperatures between 200–800° C., the SCR system should operate at higher, temperatures to achieve complete reaction between ammonia and NOx.) Thus, in Gladden '473, the fuel mass flow is sensed and $NH_3$ throttled at a percentage of fuel flow provided the temperature of the gases in the catalytic converter are within a set range. This basic control concept is used today in most mobile, ammonia, SCR systems. For example, U.S. Pat. No. 5,116,579 to Kobayashi et al. (May 26, 1992) additionally measures the humidity of intake air and one or more operating parameters of engine power, intake air temperature, fuel consumption and exhaust gas temperature to set an ammonia ratio control valve. The molar ratio of ammonia to NOx is set at less than one (sub-stoichiometric) to minimize ammonia slip.

Typically the reductant is pulse metered into the exhaust gas stream in a manner similar to that used for operating conventional fuel injectors. In U.S. Pat. No. 4,963,332 to Brand et al. (Oct. 16, 1990), NOx upstream and downstream of the catalytic converter is sensed and a pulsed dosing valve controlled by the upstream and downstream signals. In U.S. Pat. No. 5,522,218 to Lane et al. (Jun. 4, 1996), the pulse width of the reductant injector is controlled from maps of exhaust gas temperature and engine operating conditions such as engine rpm, transmission gear and engine speed.

As noted, the industrial art has long used ammonia in SCR systems to control NOx emissions typically by set point control loops such as shown in U.S. Pat. No. 5,047,220 to Polcer (Sep. 10, 1991) in which a downstream NOx sensor is used to generate a trim signal in the control loop. The industrial art has also recognized that changes in load from the turbine, furnace etc. affects the ammonia SCR systems. Thus in U.S. Pat. No. 4,314,345 to Shiraishi et al. (Feb. 2, 1982), variations in load are determined by sensing the temperature of the exhaust gas. When the exhaust gases are at certain temperature ranges a variation in the load is assumed to occur and different or predicted NH3/NOx molar ratios are used to account for the adsorption/desorption characteristics of the catalyst. A more sophisticated molar ratio control system is disclosed in U.S. Pat. No. 4,751,054 to Watanabe. Watanabe uses not only upstream and downstream NOx sensors but also temperature, flow rate and NH3 detectors to set a mole ratio correcting signal. In U.S. Pat. No. 4,473,536 to Carberg et al. (Sep. 25, 1984) a turbine's inlet airflow, discharge pressure, discharge temperature and mass fuel flow are sensed to predict NOx generated by the turbine which signal is corrected for NOx error by time delayed NOx sensor measurements. Carberg recognizes that turbine load changes may change NOx emissions in a time frame quicker than the 1 plus minute needed to determine the NOx emissions in a gas sample with conventional NOx sensors and thus makes a prediction, which can not be corrected in real time. The industrial systems, for the most part, do not operate under the highly transient conditions which characterize vehicle engines producing sudden NOx transients. Industrial systems also operate in an environment in which samples of the gas being produced can be taken to accurately determine the NOx content to trim the ammonia metering valve in closed loop control.

In addition to systems which sense engine operating parameters to control metering of ammonia or a reductant, there are other approaches used to control NOx emissions in mobile applications. In U.S. Pat. No. 5,845,487 to Fraenkle et al. (Dec. 8, 1998), the exhaust gas temperature is sensed. If the exhaust gas is outside the temperature limits at which the SCR system is effective i.e., below the operating temperature, the fuel injection timing to the engine is retarded, reducing the NOx via combustion modifications. In U.S. Pat. No. 5,842,341 to Kibe (Dec. 1, 1998) space velocity and exhaust gas temperature is measured to determine the reductant quantity. In addition inlet and outlet catalytic converter temperature is measured and reductant flow is decreased from the steady state conditions when the temperature differential between inlet and outlet begins to increase. The reductant, disclosed as HC in Kibe's preferred embodiment, does not according to Kibe otherwise contribute, by exothermic HC oxidation reactions, to heating of the catalyst mass or bed. The reductant is decreased to keep the catalyst within the operating temperature window.

Perhaps one of the more sophisticated approaches to using urea/ammonia system in a mobile application is disclosed in a series of patents which include U.S. Pat. No. 5,833,932 to Schmelz (Nov. 10, 1998); U.S. Pat. No. 5,785,937 to Neufert et al. (Jul. 28, 1998); U.S. Pat. No. 5,643,536 to Schmelz (Jul. 1, 1997); and U.S. Pat. No. 5,628,186 to Schmelz (May 13, 1997). While these patents discuss reducing reagents in a general sense, they are clearly limited to urea/ammonia reductants. According to this system, a catalytic converter having composition defined in the '932 patent, has a reducing agent storage capacity per unit length that increases in the direction of gas flow. This allows for positioning of instrumentation along the length of the catalyst as disclosed in the '536 patent to determine the quantity of ammonia stored in the catalyst. The catalyst is charged with the reducing agent such that transient emissions can be converted by the reducing agent stored in the catalytic converter. The '186 patent, however, is directed as is the present invention, to a control system not limited to any specific catalyst. The '186 patent recognizes, as does several prior art references discussed in this section, that i) sudden increases in load require a decrease in the reducing agent (and similarly sudden decreases in load require an increase in the reducing agent) and ii) the temperature (the '186 patent also requires exhaust gas pressure) of the reducing catalyst affects its ability to store and release the reducing agent. The '186 patent measures, from changes in gas pressure and catalyst temperature, the rate at which the reducing agent is being adsorbed or desorbed from the catalyst. It then calculates NOx emissions produced from the engine and sets a sub-stoichiometric ratio of reducing agent/NOx emissions at which the reducing agent is metered to the catalyst. The metering reducing agent rate is then adjusted upward or downward to equal the measured rate of reducing agent adsorption/desorption. A burner is provided to "empty" the catalyst apparently to assure a sound reference value upon engine start for measurements and to guard against slip. Assuming the adsorption/desorption theory and measurement capability is "sound", the system is sound although a large number of sensors and intensive calculations appear to be required.

Within the literature, a significant number of articles have been published investigating ammonia SCR NOx reducing systems and several articles have discussed control strategies to optimize the SCR NOx systems investigated. In SAE paper 921673, entitled "Development of an Ammonia/SCR NOx Reduction System for a Heavy Duty Natural Gas Engine" by J. Walker and B. K. Speronello, (September 1992), various quantities of ammonia were injected at various engine speeds and loads to obtain optimum NOx, conversions at steady state engine speeds and loads. The speeds and loads were mapped and stored in a look-up table (specific for each engine and each SCR catalyst) which was then accessed periodically to set an ammonia metering rate. This open loop, feed forward technique is conventionally used and produces good conversion ratios for steady state conditions.

SAE paper 970185, "Transient Performance of a Urea deNOx Catalyst for Low Emissions Heavy-Duty Diesel Engines" by Dr. Cornelis Havenith and Ruud P. Verbeek (a co-inventor of the subject application) dated February, 1997 investigates ammonia metering adjustments made during transient emissions. A pulsed urea dosage device is disclosed which uses speed and load engine sensor data read into a control unit to pulse a quantity of ammonia in stoichiometric relationship to NOx emissions, at steady state conditions. During step-urea, step-load and transient cycles, the stoichiometric relationship was decreased and a dynamic control strategy of injecting additional quantifies of urea after the transient or step or load was completed was adopted. A reduction in NOx emissions is reported although it is questionable whether the reduction was achieved because of the dynamic control strategy the additional reductant added during, the transient or a combination thereof.

SAE paper 925022, "Catalytic Reduction of NOx in Diesel Exhaust" by S. Lepperhoff, S. Huthwohl and F. Pischinger, March, 1992 is an early article that looked at step load changes to evaluate transient systems. The article recognizes that when the load on the engine changed at constant rpm, the NOx emissions increase, the temperature increases and the total exhaust flow increases. Response of the catalyst to step changes in the engine operating conditions are referred to as step load tests. Ammonia slip occurred when engine load increased and the article concludes the slip is correlated to the ammonia stored in the catalyst. It was suggested that a control program or control system would have to consider the, NOx emissions of the engine, the catalyst temperature and the ammonia stored within the catalyst, to avoid ammonia slip.

SAE paper 952493, "An Urea Lean NOx Catalyst System for Light Duty Diesel Vehicles" by H. Luders, R. Backes, G. Huthwohl, D. A. Ketcher, R. W. Horrocks, R. G. Hurley, and R. H. Hammerle, October, 1995 concludes that an ammonia SCR system can control NOx diesel emissions. The control strategy used in the study was similar to that disclosed in the Gladden and Lane patents above i.e., a microprocessor mapped engine out NOx emissions and catalytic converter temperature. Engine out NOx was derived from engine speed and torque. Space velocity (intake air mass flow) and catalyst temperature were then used with NOx out data to set a maximum NOx reduction rate. Transient operation was numerically modeled from steady state conditions. Ammonia storage and thermal inertia was noted as factors affecting the conversion but the control system discussed had no special provisions, other than numerical modeling.

SAE paper 930363, "Off-Highway Exhaust Gas After-Treatment: Combining Urea-SCR, Oxidation Catalysis and Traps" by H. T. Hug, A. Mayer and A. Hartenstein, March, 1993, describes stoichiometric injection of ammonia, without lag, based on engine mapped conditions. Catalyst porosity is stated to be important with respect to transient emissions. An injection nozzle for metering is disclosed.

An article entitled "NOx—Reduction in Diesel Exhaust Gas with Urea and Selective Catalytic Reduction" by M. Koebel, M. Elsener and T. Marti, published in Combustion Science and Technology, Vol 121, pp. 85–102, 1996 describe experiments conducted "at abrupt load changes". An abrupt reduction in load did not cause ammonia slip but an abrupt increase in load did cause ammonia slip. The article observes that the catalyst is saturated with adsorbed ammonia at lower temperatures; that increased load significantly increases NOx emissions; that increased load increases, slowly, the temperature of the catalyst. Ammonia slip occurring at the onset of the abrupt load change because of excessive ammonia present when the desorption of the ammonia is increased while the bulk at of the catalyst bed is too cool to effectively react the desorbed ammonia with the higher level of NOx. This observation has been noted in several of the prior art references discussed above. The recommendation is to retard the addition of ammonia in relation to the load increase.

In general collective summary of the prior art references discussed above, it is known that ammonia SCR systems can be used effectively to control the emissions produced by vehicles powered by diesel engines; that the reducing catalysts adsorbs and stores ammonia at low temperatures and desorbs the stored ammonia at higher exhaust gas temperatures; that steady state NOx emissions, determined from mapped speed and load engine conditions, can be readily controlled by metering ammonia in stoichiometric relationship to the NOx emissions; that it is possible to pump urea, react urea to produce ammonia and precisely control the rate of ammonia rejection to the exhaust gases by controlling pulsed injections of ammonia; and that transient emissions cause transient increases in NOx concentrations with attendant exhaust gas temperature increases requiring a reduction in the ammonia metering rate to balance the increased ammonia present attributed to desorption resulting from the temperature increase. Noticeably absent, from any of the mobile applications discussed, is a simple control system capable of quickly and effectively adjusting the metering rate during transient emissions as well metering the reductant during steady state operating conditions.

In this regard and as noted above, industrial processes, which do not have the sudden transient emission changes of a vehicular application, can utilize NOx sensors in a closed loop controlled through set-point controllers. There are no commercially available NOx sensors which have the response time needed for vehicular applications. Thus any SCR control system for mobile applications will necessarily be open loop.

SUMMARY OF THE INVENTION

Accordingly, it is a principal object of the present invention to provide a control for an NOx SCR mobile emission reduction system which is able to control the system to reduce transient as well as steady state NOx emissions without reductant slip.

This object along with other features of the invention is achieved in a method for reducing NOx emissions produced in mobile diesel applications by an external reductant supplied to an SCR system comprising the steps of a) sensing one or more engine operating parameters to predict a concentration of NOx emissions indicative of the actual quantity of NOx emissions produced by the engine; b) when the actual concentration of NOx emissions changes and the temperature of said reducing catalyst is within a set range, varying the actual concentration of NOx emissions by a time constant to produce a calculated concentration of NOx emissions different than the actual concentration of NOx emissions; and, c) metering the external reductant to the reducing catalyst in said SCR system at a rate sufficient to cause the reducing catalyst to reduce said calculated concentration of NOx emissions whereby metering of the reductant accounts for the effects on said SCR system attributed to transient NOx emissions. More particularly, the NOx constant acts to decrease the actual concentration of NOx emissions when the NOx emissions increase to avoid: reductant slip and increase the actual NOx emissions when the NOx emissions decrease to utilize the catalyst reductant storage abilities.

In accordance with an important feature of the invention, the NOx time constant is a function of the catalyst temperature within a set temperature range as that catalyst temperature relates to the capacity of any given catalyst to store reductant at that temperature. Generally, the storage ability of the catalyst decreases as the catalyst temperature increases within the catalyst temperature range whereby the reductant is metered, during and following an NOx transient, on the basis of the ability of any specific catalyst used in the SCR system to store the reductant thus minimizing the likelihood of reductant slip.

It is a distinct feature of the invention that the ability of any given catalyst to store reductant is expressed as the relative time it takes for any given catalyst to store reductant at any given catalyst temperature to generate a varying time constant that can be accessed through a conventional look up table storing time constant-catalyst temperature relationships. The time constant is utilized to account for the lag in the catalyst response to the NOx transient by modifying the NOx emission concentration in any number of ways, such as by determining a moving average of NOx emissions over varying time periods, each time period correlated to a time constant in the look-up table for a then current catalyst temperature, so that reductant dosage is determined without having to sense numerous parameters and perform numerous calculations to periodically determine current storage capacity of the catalyst for setting the reductant metering rate.

However, it is a distinct feature of the invention to provide a filter to account for the lag in the catalyst system attributed to transient NOx emission by filtering the actual NOx emissions (increasing or decreasing) to NOx concentrations which do not exceed the catalyst's ability to store reductant at its current temperature in a responsive and robust control. In accordance with this feature of the invention, the filter uses the capacity of the catalyst to store reductant at the lower temperatures of the catalyst temperature range while also providing, when the reductant is aqueous urea, improved urea hydrolysis by the provision of two first order filters in series represented in the continuous time domain by the transfer function:

$$H(s) = \frac{1}{\tau_1 \cdot s + 1} \cdot \frac{1}{\tau_2 \cdot s + 1}$$

and $\tau 1 = \tau 2 = f(Cat)$

When filtering the actual NOx emission concentration, the variable NOx time constant, $\tau$NOx, is determined from the look-up table noted above as a function of the catalyst temperature. In accordance with the broader scope of the invention, the second order filter is effective to introduce a lag for any temperature dependent relationship of the catalyst, including but not limited to those that are only straight line or constant approximations of the catalyst's ability to store reductant at certain temperatures within a temperature range of the catalyst.

In accordance with another distinct aspect of the invention, the system employs a second order filter, as represented in the continuous form designated above, to account for the changing heat fronts moving through the catalyst bed which are attributed to NOx transient emissions and produces a functional catalyst temperature which is a more accurate temperature than that achieved by sensing pre or post or mid-bed catalyst temperatures. In accordance with this aspect of the invention, (which is not limited in application to control systems which factor NOx concentrations but can be applied to any mobile system which measures or senses catalyst temperature for any reason), the catalyst time-constant $\tau$Cat is a function of the space velocity of the exhaust gases through the catalyst.

In accordance with this distinct feature of the invention, a method for determining the functional temperature of a catalyst in an exhaust system of a vehicle includes the steps of i) determining, by sensing or calculating, the temperature of the exhaust gases and the space velocity of the exhaust gases through the catalyst and ii) filtering the exhaust gas temperature by a catalyst filter, to generate the functional temperature of the catalyst. Significantly, the catalyst filter implements a time constant determined as a function of changing space velocity to filter the exhaust gas temperature and is implemented in the continuous time domain by a second order filter as set forth above.

In accordance with a still further feature of the invention, the transfer function, H(s), for the NOx and catalyst filters of the present invention can be easily implemented in any number of discrete forms into the vehicle's existing microprocessor because any of the conventional difference equations implementing the transfer function in discrete form are not memory intensive.

In accordance with yet another aspect of the invention, the two first order filters forming the functional catalyst temperature are split, upon engine shut-down, from a series relationship into two individual parallel operating first order filters with ambient temperature fed as filter input to the temperature of the catalyst so that after short engine stop/start periods, the cooled down temperature of the catalyst is used in the second catalyst filter to prevent reductant slip after engine restart. In accordance with this aspect of the invention, the cool down time constant, $\tau$Cool, is determined as a function of time elapsed from vehicle shut down or parameters that represent difference in temperature. By arranging both filters in parallel so that each receives the same information, the second parallel filter is prevented from freezing or drifting when the filters are switched back to series relationship upon restart of the vehicle.

In accordance with a specific feature of the invention, the external reductant is ammonia and the storage capacity of the reducing catalyst which is used to set the time constant $\tau$NOx for any given catalyst is a function of a) the surface area of the catalyst over which the exhaust gases flow, b) the number and strength of adsorption/absorption sites on the surface area and c) the ability of the catalyst washcoat to store NOx at any given temperature within the set temperature range whereby a control method not only uses a well known reductant to optimize the performance of any given catalyst, but also provides a method to optimally size a reducing catalyst for any given engine/vehicle combination to, meet regulated drive cycle NOx emission requirements.

In accordance with a still further feature of the invention, the external reductant is metered at a normalized stoichiometric ratio of reductant to NOx emission established for the current functional catalyst temperature (as determined by the catalyst NOx constant) whereby each essential step of the method, i.e., the NOx emissions, the catalyst functional temperature and the NSR ratio, have all been adjusted to account for the inevitable effects on the SCR system resulting from engine operating conditions producing NOx transient emissions which otherwise adversely affects the operation of the SCR system. Again, the current state of the catalyst does not have to be sensed nor intensive calculations run based on sensed catalyst state to set the reductant rate.

Still another specific and inclusive feature of the invention is to provide a method for metering an external reductant to a reducing catalyst in an SCR system applied to a vehicle powered by an internal combustion engine which includes the steps of a) sensing operating conditions of the vehicle and engine to generate, by calculation and/or measurement, signals indicative of the actual quantity of NOx emissions emitted by the engine, the temperature of the exhaust gas and the space velocity of the exhaust gas;

b) filtering, when the temperature of the catalyst is within a set temperature range, the actual NOx emission signal by an NOx time constant to produce a calculated NOx signal different than the actual NOx signal when the NOx signal is changing;

c) filtering the exhaust gas temperature signal by a catalyst time constant to produce a functional catalyst temperature signal different than the exhaust gas temperature when the space velocity signal changes;

d) factoring the functional catalyst temperature signal and the space velocity signal to generate a NSR signal indicative of a normalized stoichiometric ratio of reductant to NOx emissions; and, e) metering the reductant to the reducing catalyst by factoring the calculated NOx signal by the NSR signal to produce a metering signal controlling a metering device for the external reductant.

It is a general object of the invention to provide a nitrogen based SCR control system for NOx emissions produced by diesel powered vehicles.

It is another general object of the invention to provide an external reductant SCR control system for mobile IC engine applications which minimizes reductant slip while utilizing the ability of the SCR catalyst to store reductant.

It is an object of the invention to provide a control system for mobile NOx SCR systems having any one or any combination of the following characterizing features:

a) Ability to control reduction of transient as well as steady state NOx emissions;

b) Ability to prevent reductant slip during NOx transient emissions;

c) Simple to implement in programmable routines not subject to extensive memory requirements stored in the ECU;

d) Robust, stable and not subject to significant drift over time;

e) Able to account for thermal aging of catalyst;

f) Easily implemented in OBD diagnostic systems;

g) Inexpensive because it requires no additional parts or components other than what is currently used in state-of-art systems;

h) Not limited to any specific driving cycle or test cycle; and i) Insensitive to arbitrary changes to temperature and/or load and/or NOx emissions.

Another distinct but related object of the invention to provide a method for determining the functional catalyst temperature of SCR catalysts for use in any control type system resulting from changes attributed to NOx transient emissions notwithstanding what methodology is used to establish the catalyst temperature at steady state conditions.

Still another stand alone but related object of the invention is to provide a method for ascertaining the start-up temperature of any catalyst in any emission system.

Still yet another object of the invention is to provide a control system for a mobile IC engine SCR application which is able to account for changes to the SCR system attributed to NOx transient emissions notwithstanding the fact that such control systems may employ NOx and/or reductant sensors assuming commercially acceptable, time responsive sensors are developed for mobile engine applications.

Still another object of the invention is to provide an SCR control system for mobile IC applications using an external reductant which can function with any design or type of reducing catalyst used in the SCR system.

Another object of the invention is the provision of an SCR control system for mobile IC applications using an external reductant which provides a basis for optimizing the selection of any specific reducing catalyst for any given engine/vehicle combination.

Yet another object of the invention is to provide an SCR control system for an external reductant which determines and uses the storage/release capacity of reductant and NOx emissions for any given SCR catalyst to control reductant metering in a manner that accounts for the capability of that specific catalyst to reduce NOx emissions as a result of NOx transient emissions produced by the engine.

A still further object of the invention is the provision of a control system for an external reductant applied to a mobile IC engine having an SCR system in which reductant usage is minimized while maintaining high NOx conversion.

Another object of the invention is to provide a control system for an external reductant SCR system which emulates the lag of the catalyst following NOx transient emissions by use two simple first order filters in series having time constants determined as a function of temperature.

These and other objects, features and advantages of the present invention will become apparent to those skilled in the art upon reading and understanding the Detailed Description of the Invention set forth below taken in conjunction with the drawings.

BRIEF DESCRIPTION OF THE DRAWINGS

The invention may take form in certain parts and an arrangement of parts taken together and in conjunction with the attached drawings which form a part of the invention and wherein:

FIG. 9 is a graph of an ETC test plotting the functional catalyst temperature predicted by the invention, the sensed mid-bed catalyst temperature and the sensed average catalyst temperature;

DETAILED DESCRIPTION OF THE INVENTION

Figure 1:
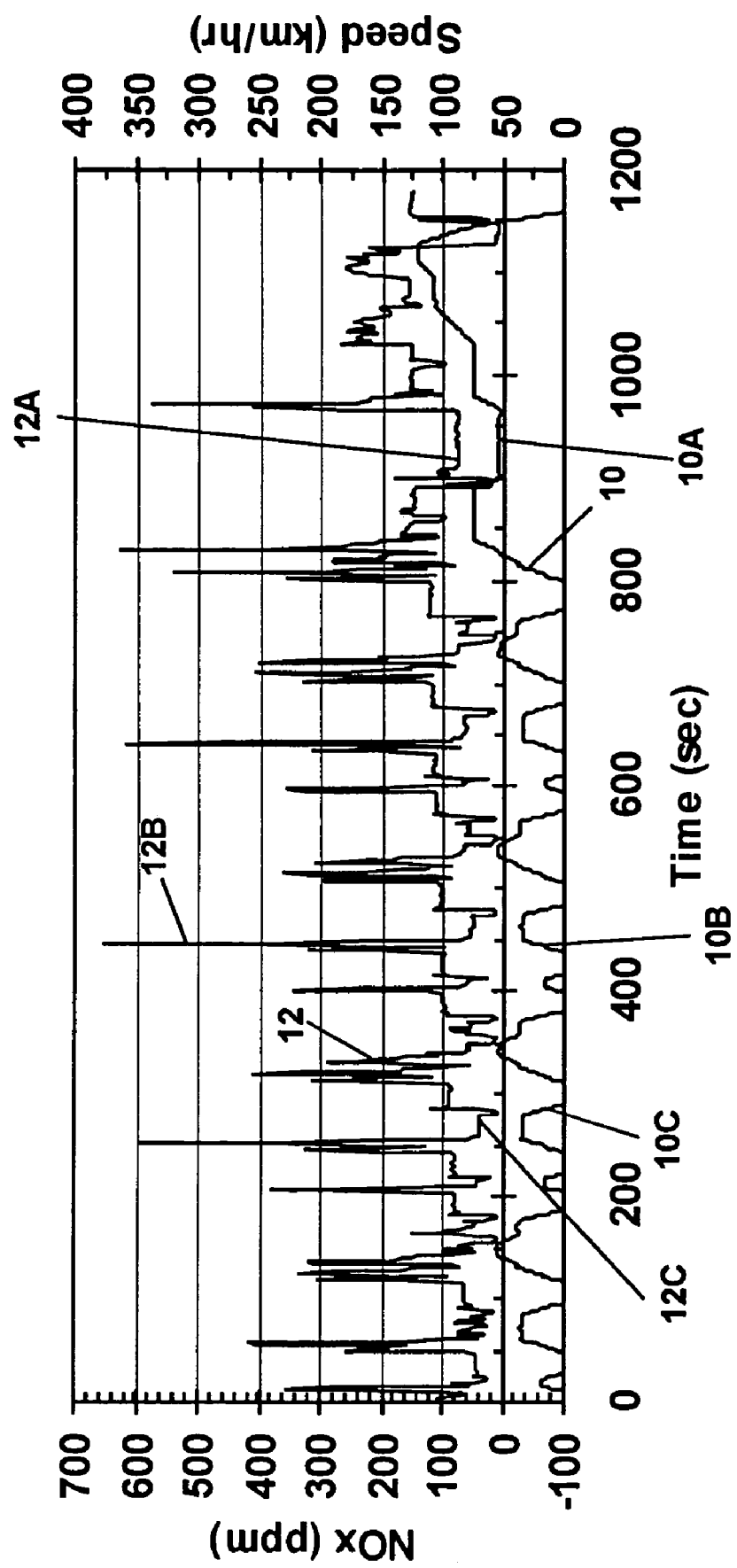
FIG. 1 is a graph of NOx emissions produced in the exhaust gases of a diesel powered vehicle during the European MVEG cycle.

Referring now to the drawings wherein the showings are for the purpose of illustrating a preferred embodiment of the invention only and not for the purpose of limiting the same, there is shown in FIG. 1 an MVEG test conducted with a test vehicle equipped with a 1.9 liter turbocharged, direct injection (TDI) diesel engine, i.e., a light duty test vehicle. The invention will be described throughout as applicable to a diesel engine, but as indicated above, the invention, in its broader sense, is applicable to any internal combustion (IC) engine, such as gasoline fuel type engines operated lean or with "lean burn" engine fuel strategy.

In FIG. 1, the European MVEG cycle is plotted in seconds on the x-axis with the nitrogen oxides (NOx) emitted by the vehicle during the drive cycle plotted on the left-hand y-axis and the vehicle speed plotted in km/hr on the right-hand y-axis. The lower trace identified by the reference numeral 10 is a plot of the vehicle speed over the timed portion of the drive cycle. The uppermost plot identified by reference numeral 12 are the NOx emissions produced by the diesel powered vehicle during a regulated drive cycle and is characterized, rather dramatically, by "spikes" of NOx transient emissions. Several factual observations concerning the graph of FIG. 1 should be noted as follows:

1) When the vehicle is traveling at a constant speed, the NOx emissions are somewhat constant. This can be shown, for example, by looking at that portion of the vehicle speed plot designated by reference numeral 10A and comparing it to the generally flat portion of NOx emissions generated during that time period in the NOx plot section designated by reference numeral 12A. Assuming load is constant, constant vehicle speed will produce constant or "steady state" NOx emissions. As discussed in the Background, NOx control strategies in use today are based on steady state conditions. Thus when an SCR system uses an external reductant, the external reductant is metered, under today's strategies, at a rate sufficient to reduce the NOx constant emissions produced at 12A. If the speed (and load) of the vehicle remain fairly constant, as in most industrial processes, high NOx conversion efficiencies can be obtained. FIG. 1 shows why that control philosophy can not work with a mobile IC engine application.

2) When the vehicle accelerates, such as indicated by the acceleration designated as reference numeral 10B, the NOx emissions correspondingly and dramatically increase or "spike" as shown by spike 12B and the spike or pulse or increase in NOx emissions is commonly referred to as an NOx transient. Further the faster the acceleration (or rate at which load is applied to the vehicle), the greater the NOx transient emission. The time scale used in FIG. 1 does not permit scrutiny of each of the transient pulses or "spikes". However, each transient has a leading edge and a trailing edge. The leading edge which at its peak defines the amplitude of the transient emission inherently occurs as an inevitable result of the combustion process within the engine. The trailing edge exhibits a more gradual decline. The drive cycle of FIG. 1 was performed on a diesel powered vehicle with exhaust gas recirculation (EGR). Advances in the micro-processor art coupled with known computer-based techniques such as feed forward, artificial intelligence, adaptive learning, etc., have resulted in faster responding EGR systems which act to dampen the trailing edge of the transient. However, the leading edge of the transient will always occur. The expected advances in the EGR art conceivably could result in a lowering of the overall NOx concentrations. However, such systems will not replace the control system of the present invention or the need for a control method such as described herein. That is, improved EGR systems will supplement the control method described herein to assure full functionality of the SCR system using an external reductant, over the entire operating range of the engine.

3) When the vehicle decelerates, such as at the deceleration designated by reference numeral 10C, the NOx emissions drop and drop below the NOx concentration which occurs at steady state conditions such as indicated by the corresponding NOx emission drop shown by reference numeral 12C in FIG. 1.

In general summary, FIG. 1 shows the NOx transient emissions comprise a significant portion of the NOx emissions emitted by a diesel powered vehicle during a regulated drive cycle.

As a matter of definition, and when used in this Detailed Description and in the claims:

a) "Deceleration" means an engine operating condition whereat the vehicle motors the engine.

b) "Acceleration" encompasses a rate of change in the engine system which is increasing and is not limited merely to rate changes in the engine rpm but also includes i) increases in engine load whether or not accompanied by a change in engine speed and ii) changes in operating parameter(s) of the total engine "system" such as for example by a change in EGR flow or composition or actuation of a turbo charger.

c) "NOx transient" means a temporary increase in NOx emissions as explained with reference to FIG. 1, and by "definition", occurs at an acceleration.

d) "Steady state" means constant and occurs when the engine operating parameters or the engine "system" does not significantly change over a discrete time period, i.e., say NOx varies ±5%.

e) "SCR" means selective catalytic reduction and includes a reducing catalyst(s) which speeds or enhances a chemical reduction of NOx by a chemical reagent.

f) "External reductant" means any reducing reagent which is supplied to the exhaust stream from a source other than the products of combustion produced in the combustion process of the engine. In the preferred embodiment, the external reductant is a nitrogen based reagent such as ammonia metered in liquid or gaseous form to the reducing catalyst. However, as indicated above, the control of the present invention is also capable of functioning with other reductants such as fuel oil.

g) "Normalized stoichiometric ratio" or "NSR" is defined as the molar quantity of reductant injected to the reducing catalyst divided by the theoretical molar quantity of reductant which is needed to completely reduce NOx. Setting the NSR<1 or sub-stoichiometric is a common practice to avoid reductant slip.

h) "Space velocity" is the volumetric flow rate of the exhaust gas at standard conditions (one atmosphere and 20° C.) divided by the volume of the catalyst, i.e., vol of gas [m$^3$/hr]/volume of catalyst=–1 hr.$^{-1}$.

i) "Storage capacity" is the ability of a reducing catalyst to adsorb or store a reductant and/or NOx emissions on its surface at a given temperature.

Figure 2:
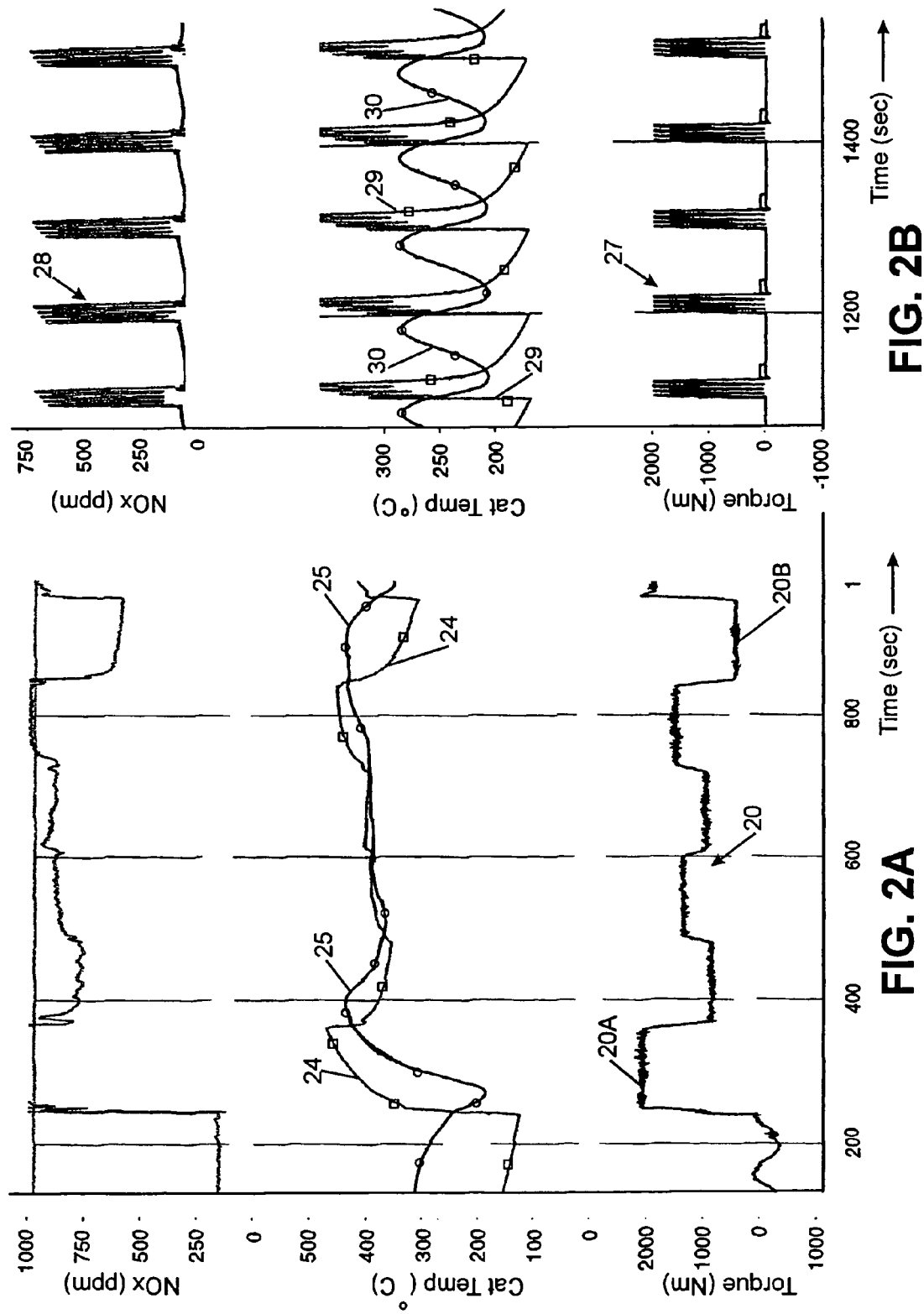
FIG. 2A depicts a series of graphs showing torque, inlet and outlet catalyst temperatures and NOx emissions produced over time during a step load test of a diesel powered vehicle.
FIG. 2B depicts a series of graphs similar to FIG. 2A for a rapidly sequencing step load test.

Referring now to FIG. 2A, there is shown a portion of a European steady-state cycle (ESC), i.e., a heavy duty test. This cycle steps through a series of constant load and speed combinations. These data shown were taken from a 12 liter heavy duty diesel engine which did not have an EGR system. The catalyst system was supplied from Engelhard Corp. and included a reducing or deNox catalyst and an oxidation catalyst. A urea external reductant was applied in a conventional manner to be described below. Control of the reductant was by a separate microprocessor which control communicated with the engine control unit (ECU). The control metered the reductant in a manner designated herein as "NOx following" which means the reductant was metered based on the actual NOx emissions emitted by the engine as predicted by conventional technology using steady state NOx maps of selected engine operating parameters and the catalyst inlet temperature. The data shown in FIG. 2A is thus somewhat typical of what occurs in conventional control techniques which sense the engine operating parameters to determine steady-state NOx emissions and then meter an external reductant into the exhaust gas at an NSR ratio sufficient to cause reduction of the NOx emissions as they pass over the reducing catalyst.

In FIG. 2A several plots or traces are shown over a timed portion of an ESC cycle shown as seconds on the x-axis. The lowest most trace, designated by reference numeral 20, plots the load or torque on the y-axis. It can be readily seen that the load is applied in steps with the test including a relative high step load designated by reference numeral 20A, followed by a series of 4 slightly varying, intermediate load steps followed by a relative low load step designated by reference numeral 20B.

The uppermost trace of FIG. 2A is a plot of the NOx emissions in ppm (parts per million) emitted for the step loads imposed on the engine shown by trace 20. The emission scale for the plot is limited to 1000 ppm of NOx and the emissions produced during step load cycle 20A is "off the graph". The remaining trace is within the scale and basically correlates the known fact that engine loadings result in NOx emissions attributed to the load. Note that the NOx concentrations basically correspond to the torque on the engine.

The middle trace of FIG. 2A is plot of the exhaust gas temperature at the inlet of the reducing catalyst designated by the trace passing through squares and indicated as reference numeral 24 and a plot of the exhaust gas temperature at the outlet of the reducing catalyst designated by the trace passing through circles and indicated as reference numeral 25. Two observations should be noted. First, for "significant" step load changes, i.e., 20A and 20B, the outlet temperature of the catalyst significantly lags the inlet temperature of the catalyst and this lag can be hundreds of seconds. On the other hand when the step loads do not significantly vary as shown by the mid band portion of load trace 20, the outlet temperature follows the inlet temperature of the catalyst.

Referring now to FIG. 2B, there is shown the results of an especially constructed step load using the same engine and reductant control strategy discussed with reference to FIG. 2A. In FIG. 2B, a series of 5 rapidly applied step loads are applied to the engine followed by a "no load" period as shown by the lowermost trace designated by reference numeral 27. The five rapidly applied step loads can be viewed as indicative of engine loads applied as the operator shifts the transmission of a vehicle through various gear ranges. As expected, the uppermost trace of FIG. 2B designated by reference numeral 28 shows increase and decrease of NOx emissions corresponding to the rapid changes in load trace 27.

As in FIG. 2A, the middle portion of FIG. 2B shows a plot of exhaust gas temperature at the inlet, of the reducing catalyst passing through squares and designated by reference numeral 29 and a plot of exhaust gas temperature at the outlet of reducing catalyst passing through circles and designated by reference numeral 30. Catalyst inlet and temperature plot 29 clearly shows a rapid exhaust gas temperature increase during the transient NOx emission. Temperature plot 30 shows a periodic delay or lag before the exhaust gas temperature at the outlet "catches up" to the inlet temperature. FIG. 2B shows that as a result of changes to the operating conditions of the engine, the catalyst inlet temperature and NOx concentration rise and fall following the change in engine operating conditions. However, a periodic time delay occurs before the entire reducing catalyst is affected by the change in exhaust gas temperature caused by the NOx transient emission. This is admittedly difficult to discern in the ESC step load tests illustrated in FIG. 2A and still yet more difficult to discern in a drive cycle such as shown in FIG. 1. However, this relationship, demonstrated in the specially constructed tests of FIG. 2B, forms one of the underpinnings of the present invention.

More specifically, a reducing catalyst, preferably one formulated to react with a nitrogen reagent, has an ability to store and release the reductant and heat. The NOx emission is, for all intents and purposes, instantaneously formed and passes through the system at the speed of the exhaust gas. If the catalyst has sufficient stored reductant, the transient NOx emission will react with the reductant and be reduced. The time constant for the NOx transient to pass through the catalyst bed is much smaller (i.e., the speed of the gas) than the time constant for the temperature pulse to pass through the catalyst bed. As the temperature of the reducing catalyst increases, its ability to store reductant and NOx decreases. Conventional control systems meter the reductant on the basis of NOx emissions currently produced. FIG. 2B clearly shows that it is not only possible but likely that any given NOx transient can occur while the temperature of the reducing catalyst is experiencing the after effects of a prior NOx transient and is within a temperature range whereat the reductant rate called for by the current NOx transient can not be stored on the catalyst. The inevitable result is reductant slip. The present invention addresses this problem, as explained in detail below, by accounting for the ability of the catalyst, at any given time, to store and release the reductant and NOx emissions with respect to the NOx emissions being currently produced by the engine.

Figure 3:
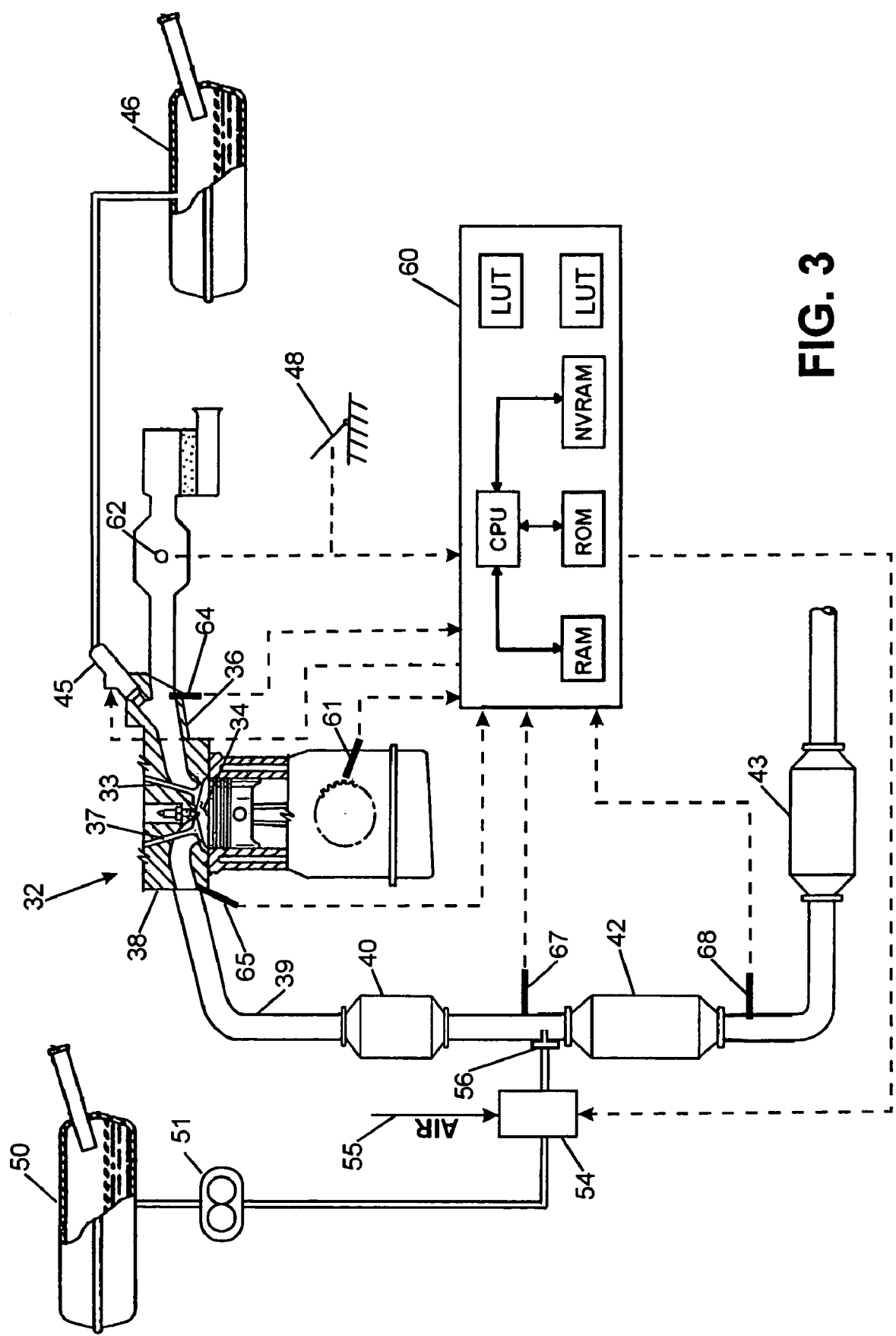
FIG. 3 is a schematic representation of an SCR system controlled by the method of the invention.

Referring now to FIG. 3, there is shown schematically the elements comprising an external reductant supplied SCR system applied to a mobile internal combustion engine 32. An intake valve 33 controls admission of air to the engine's combustion chamber 34 from an intake manifold 36. An exhaust valve 37 controls the emission of exhaust gases produced to an exhaust manifold 38, in turn connected to an exhaust pipe 39. Attached to exhaust pipe is a close-coupled catalyst 40 followed by a reducing or de-Nox catalyst 42 in turn followed by an oxidation catalyst 43.

All catalysts shown, 40, 42, 43, are conventional. While reducing catalyst 42 is a necessary element for the inventive system to work, it is not, per se, part of the invention. That is the inventive method and system does not require specially formulated catalysts to function. Reducing catalyst 42 may generally comprise a zeolite or a mixture of titanium, vanadium, tungsten and/or molybdenum oxides and one or more reducing catalysts may be used or different catalyst bed formulations used in one reducing catalyst. Reference may be had to Byrne U.S. Pat. No. 4,961,917 incorporated herein by reference for a description of a suitable reducing catalyst. Generally, the oxidation catalyst comprises a support such as alumina and a precious metal such as platinum for example. As is generally known, oxidation catalyst 43 is provided, among other reasons, to oxidize the excess of any unreacted ammonia leaving reducing catalyst 42 with oxygen to nitrogen and water. Reference may be had to Speronello et al. U.S. Pat. Nos. 5,624,981 and 5,516,497, incorporated herein by reference, for a staged metal promoted zeolite catalysts having a stage favoring oxidation of excess ammonia. Close coupled catalyst 40 is designed to reduce emissions during cold start and reference may be had to Sung U.S. Pat. No. 5,948,723, incorporated herein by reference for a description of a catalyst suitable for cold start engine applications.

A fuel injector 45 receives pressurized fuel from a fuel tank 46 for pulse metering of the fuel into combustion chamber 34. A fuel demand command, i.e., accelerator pedal, schematically represented by reference numeral 48 controls fueling and consequently the speed/load of the vehicle.

In the embodiment of FIG. 3, an aqueous urea reservoir 50 stores a urea/water solution aboard the vehicle which is pumped through a pump 51 including a filter and pressure regulator to a urea injector 54. Urea injector 54 is a mixing chamber which receives pressure regulated air on line 55 which is pulsed by a control valve to urea injector 54. An atomized urea/water/air solution results which is pulse injected through a nozzle 56 into exhaust pipe 39 upstream of reducing catalyst 42.

This invention is not limited to the aqueous urea metering arrangement shown in FIG. 3. It is contemplated that a gaseous nitrogen based reagent will be utilized. For example, a urea or cyanuric acid prill injector can meter solid pellets of urea to a chamber heated by the exhaust gas to gasify the solid reductant (sublimation temperature range of about 300 to 400° C.). Cyanuric acid will gasify to isocyanic acid (HNCO) while urea will gasify to ammonia and HNCO. With either reductant, a hydrolysis catalyst can be provided in the chamber and a slip stream of the exhaust gas metered into the chamber (the exhaust gas contains sufficient water vapor) to hydrolyze (temperatures of about 150 to 350° C.) HNCO and produce ammonia.

In addition to urea and cyanuric acid other nitrogen based reducing reagents or reductants especially suitable for use in the control system of the present invention includes ammelide, ammeline, ammonium cyanate, biuret, isocyanic acid, melamine, tricyanourea, and mixtures of any number of these. However, the invention in a broader sense is not limited to nitrogen based reductants but can include any reductant containing HC such as distillate fuels including alcohols, ethers, organo-nitro compounds and the like (e.g., methanol, ethanol, diethyl ether etc) and various amines and their salts (especially their carbonates), including guanidine, methyl amine carbonate, hexamethylamine, etc.

The operation of engine 32 is under the control of an ECU (engine control unit) 60. ECU 60 is a microprocessor based control system containing a conventional CPU with RAM, nonvolatile RAM, ROM, look-up tables for engine mapping purposes, etc. ECU 60 receives input sensor signal information, processes the data by programmed routines and generates actuator output signals. While a dedicated processor could be supplied to control the SCR system of the present invention, it is a particular feature of the invention that the control system can function with existing sensors and the ECU now used to control the operation of engine 32.

Conventional sensor input signals now processed by ECU 60 and utilized in the current control system include a speed/load signal from a speed/load pickup 61 (i.e., a speed sensor and a torque sensor such as used in the engine's transmission), a fuel demand signal from accelerator pedal 48, air intake temperature signal (optionally and additionally humidity) from a temperature sensor 62, mass air flow from a pressure or air flow sensor 64 and optionally an exhaust gas temperature sensor from a temperature sensor 65 if the vehicle is so equipped. (Alternatively, exhaust gas temperature can be modeled by ECU 60 from other sensors not shown such as ambient temperature, coolant temperature, fueling signals. See the '064 patent incorporated by reference herein.) If additional sensors are to be supplied, such sensors would take the form of a catalyst inlet exhaust gas sensor 67 or alternatively, catalyst inlet exhaust gas sensor 67 and a catalyst outlet exhaust gas sensor 68 for calculating mid-bed steady state temperatures of reducing catalyst 42. As indicated, ECU 60 reads the sensor input signals, performs programmed routines typically involving look-up tables to access mapped data and generates output or actuator signals such as fuel injector actuator signal shown on dash line 69. Insofar as the control system of the present invention is concerned, ECU 60 generates a metering signal on dash line 70 to urea injector 54.

Figure 4:
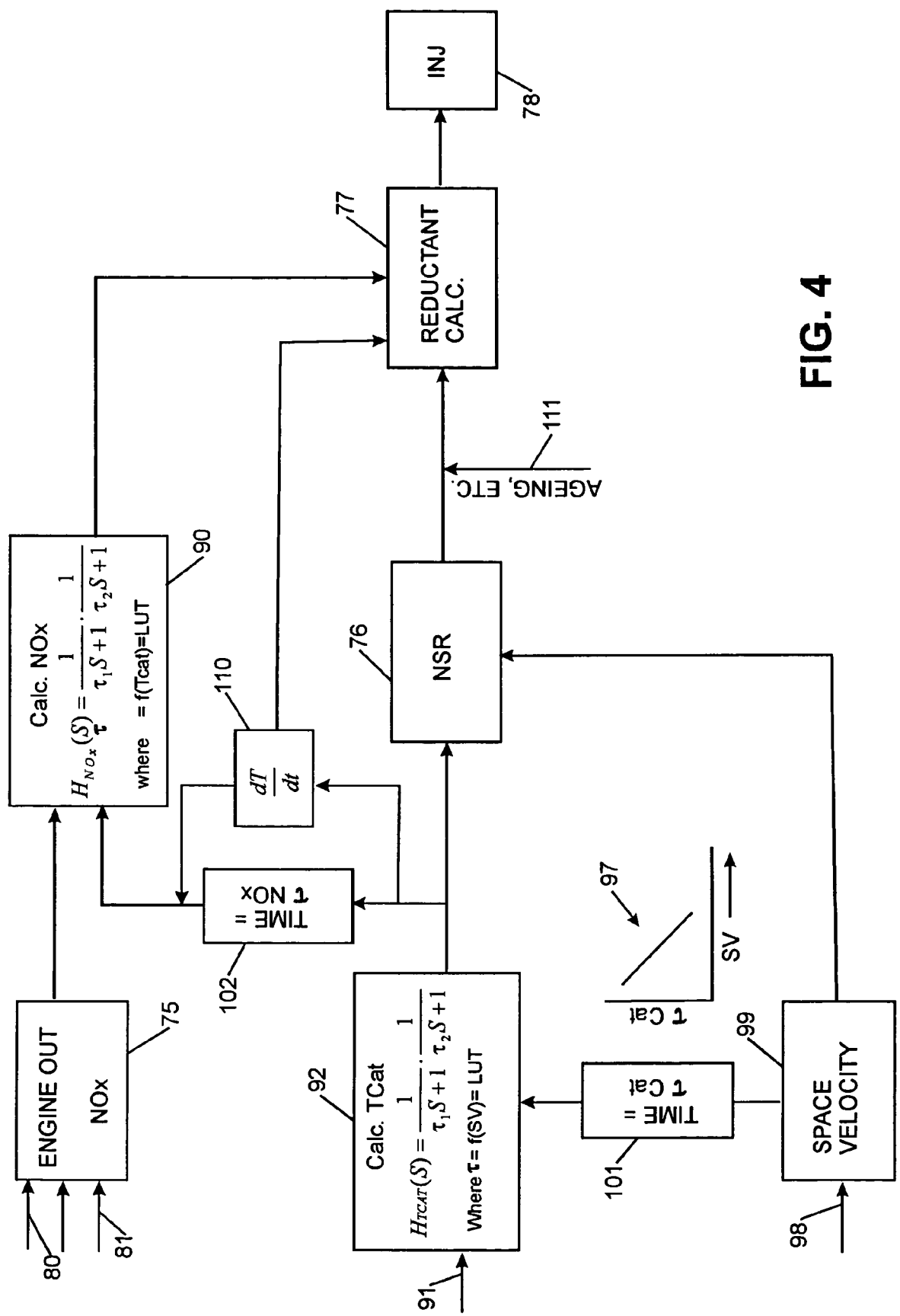
FIG. 4 is a flow chart indicative of the steps used in the present invention to control the SCR system.

Referring now to FIG. 4, there is shown a flow chart of the present control system which is conventional in the sense that engine operating parameters are read to determine a NOx concentration of emissions produced by the engine at engine out NOx block 75; a normalized stoichiometric ratio of reductant to NOx emissions is set at NSR block 76; a reductant rate is set based on the NSR and engine out NOx emissions at reductant calc. block 77 and urea injector 54 is instructed at injection block 78 to meter the atomized urea/water mixture at a defined pulse based on reductant calc. block 77.

In particular, engine out NOx block 75 receives a speed signal 80 and a torque signal 81 from speed/load sensor 61 at any given time and accesses a map stored in a look up table in ECU 60 to predict for that time the actual NOx emissions emitted by engine 34. Reference can be had to SAE paper 921673, incorporated by reference herein, for several torque/speed maps. While some prior art has suggested mapping NOx transient emissions, the suddenness of the transient coupled with varying decay coupled further with overlapping or compound transients is believed to either render the mapping not feasible or the mapping would be so extensive that a significant increase in memory of ECU 60 would be required.

Within the prior art, the NSR ratio at NSR block 76 has been simply been set at some fixed sub-stoichiometric ratio to minimize reductant slip or breakthrough. Others, recognize that competing oxidation reactions at higher catalyst temperatures (among other reasons) adjust the NSR ratio to reflect a sub-stoichiometric NSR at current catalyst temperature. Still others, additionally recognize that the residence time or contact time (i.e., space velocity) of the reductant with the catalyst has to be sufficient to allow the reductant to diffuse and react with the NOx but state that the system design or system operation is such that the residence time is not a limiting factor. These prior art systems determine the NOx concentration (predicted open loop from steady state engine maps) and meter the reductant at a rate determined by the NSR, established in the manner indicated, applied (i.e., multiplied) to the NOx concentration.

Figure 5:
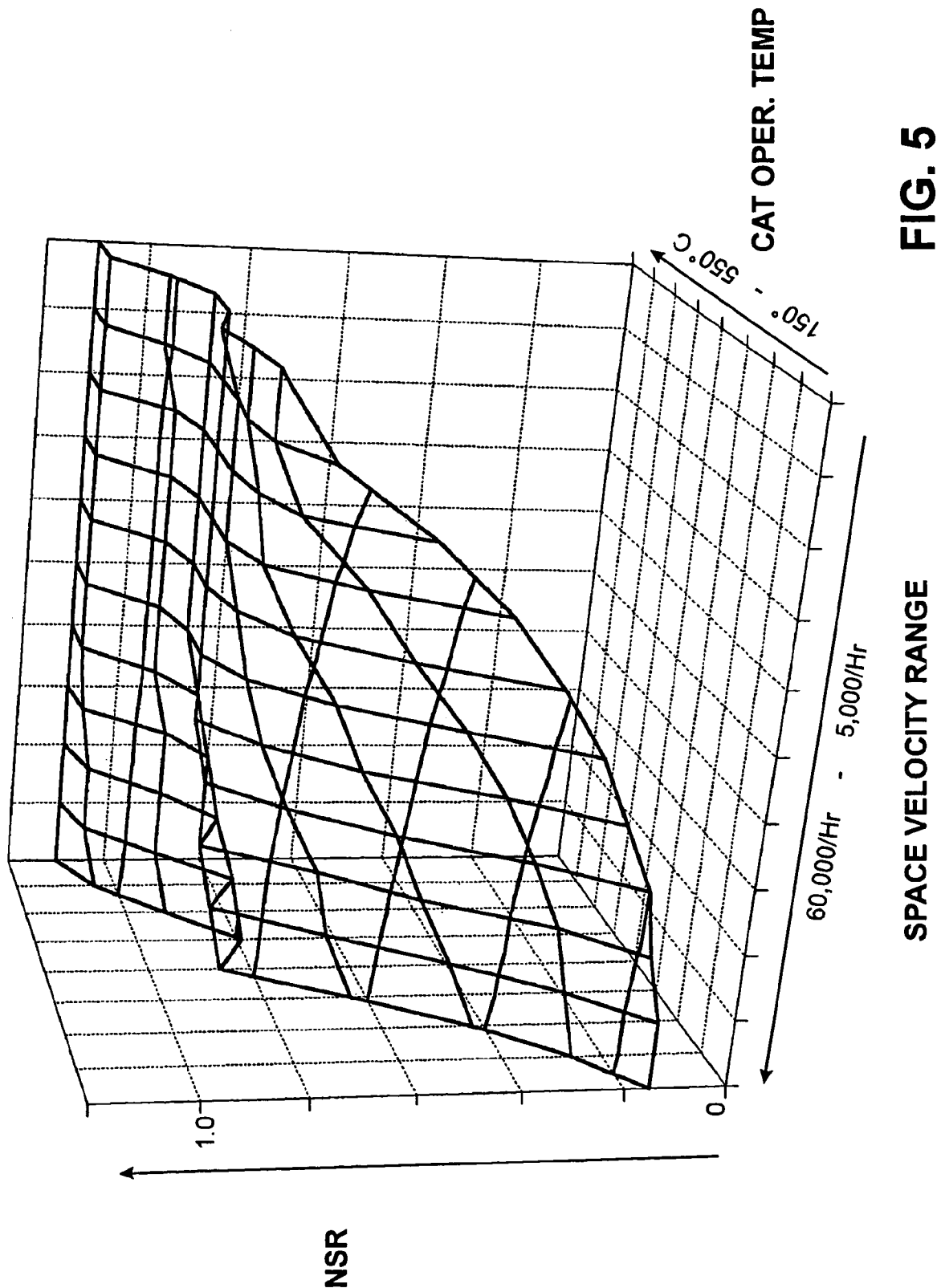
FIG. 5 is a map of space velocity and catalyst temperature variables resulting in various normalized stoichiometric ratios.

This invention follows a generally similar approach in that a concentration of NOx is determined and a NSR value is applied to the NOx concentration to determine the rate at which the reductant is metered upstream of reducing catalyst 42. However, the NSR is extrapolated from a stored look-up table which sets a NSR value which will not produce a reductant slip above a set reductant range, i.e., say 5 ppm ammonia or 3 ppm ammonia. The actual slip concentration is set at or below a or an expected regulatory standard. An example of an NSR map used in the present invention and stored in a look-up table to be accessed by ECU 60 is contained in FIG. 5. In FIG. 5, catalyst temperature is plotted on the z-axis and encompasses a temperature range at which reducing catalyst 42 can reduce NOx emissions, typically 200–400° C. but generally 150–600° C. The space velocity is plotted on the x-axis, typically anywhere from 5 to 60,000 hr.$^{-1}$, and the NSR ratio, plotted from a value in slight: excess of 1 to zero, (producing a reductant slip within a defined range) is plotted on the y-axis. Note the significant variation in NSR as a result of variations in space velocities and catalyst temperatures.

By way of explanation, reference can be had to an article "NOx Removal with Combined Selective Catalytic Reduction and Selective Noncatalytic Reduction: Pilot-Scale Test Results" by B. Gullett, P. Groff, M. Linda Lin and J. M. Chen appearing in the October, 1994 issue of *Journal of Air & Waste Management Association*, pages 1188–1194, (the "Pilot-Test Article), incorporated by reference herein and made a part hereof. The authors of the Pilot-Test Article had earlier presented a paper entitled "Pilot-Scale Testing of NOx Removal with Combined Selective Catalytic Reduction and Selective Non-Catalytic Reduction" at the 1993 Joint EPA/EPRI Symposium on Stationary Combustion NOx Control, Bal Harbour, Fla. (the "Paper") also incorporated by reference herein and made a part hereof. Both the Paper and the Pilot Test Article discuss an industrial NOx reduction system using a hybrid SNCR/SCR system which nevertheless drew several conclusions relative to the SCR system which have been utilized and expanded in this invention. The Pilot-Test Article recognized that space velocity is a controlling factor but determined that space velocity did not affect the performance of the SCR catalyst when the stoichiometric ratio of ammonia to NOx was set at 1 or less. The Paper discussed high space velocities (encompassing velocities capable of being achieved by mobile applications) but concluded the stoichiometric ratio was not significantly influenced by the high space velocities. The Pilot-Test Article also recognized that there was an optimum temperature range for the SNCR system. However, the article did conclude that ammonia slip can be determined on the basis of the stoichiometric ratio of ammonia/NOx and is independent of the quantity of NOx, i.e., FIG. 7 of the Pilot-Test Article. That conclusion has since been verified for mobile SCR applications to which this invention relates. However, it has been determined that space velocity does affect ammonia slip for any given NSR of 1 or less as well as temperature (within the set temperature range). Importantly, it has been determined that a relationship exists between NSR, space velocity and catalyst temperature which will produce a reductant slip of a set concentration. Accordingly, it is possible to model space velocity, catalyst temperature and NSR for any practical slip concentration to establish a NSR value at any given sensed (or modeled or computed) catalyst temperature and space velocity from which a rate at which the reductant is metered can be established without producing a reductant slip that exceeds a set amount. Although a mathematical model could be generated, in practice, the NSR values are determined empirically for any given reducing catalyst and mapped as shown in FIG. 5. Establishing a range of NSR values, which is substantially sub-stoichiometric, producing no more than a set concentration of reductant slip as a function of space velocity and catalyst temperature within a set range is believed different than that used in other mobile SCR control systems and forms a part of the present invention. It should be understood that the invention disclosed herein will function using any conventional prior art system for setting the NSR. Improved results are possible using the method of establishing a NSR value vis-a-vis FIG. 5. Still further, any conventional SCR control system relying on steady state conditions to establish metering of the reductant or any other system to establish the concentration of NOx emissions to be reduced, can be improved if the NSR is determined at a set slip range by modeling space velocity, catalyst temperature and NSR for that range.

As described thus far, this method will produce very high NOx conversion efficiencies sufficient to meet increasingly stringent NOx regulations but only for steady state engine operating conditions.

For reasons discussed above with reference to FIGS. 2A and 2B, the after effects of the NOx transient are not felt until a relatively long and variable time has elapsed. While the median temperature of the catalyst bed defines the ability of the catalyst bed, the precise position in the bed at which a median temperature can be sensed changes as the effects of the transient emissions are experienced by the catalyst. Because of the transient wave front moving through the bed even if temperature upstream and downstream of the reducing catalyst was simultaneously sensed and applied to some formula giving a mid-bed temperature (for example, the temperature summed divided by two) an instantaneous temperature indicative of the median bed temperature would not result. Apart from considerations relating to the temperature of the reducing catalyst, it is generally known that conventional steady state systems cause reductant slip on acceleration. This results because the transient calls for a corresponding high amount of reductant while the catalyst is partially or fully charged with stored reductant and the catalyst bed temperature is substantially less than the inlet temperature, so that slip inevitably occurs. After the transient the engine NOx emissions drop and the steady state system calls for a reduction in the reductant. However, the transient has already passed through the reducing catalyst and the stored reductant used so that the reducing catalyst is ready to store the reductant but the system calls for minimum reductant.

This invention introduces a delay in the control system to account for the after effects of NOx transients while still allowing steady-state control to occur. A delay is introduced in the actual emissions determined in engine out NOx block 75 by an NOx filter block 90 and a delay is introduced in the catalyst temperature signal 91 (such as sensed by temperature sensors 65, or 67, or 67 and 68, or modeled from engine operating parameters) by a Cat filter block 92. Each filter block 90, 92 changes its input signal in a diminishing manner over a lag or delay period correlated to the time constant used in the filter. In accordance with the broader scope of the invention, a non-varying or an arbitrary time constant can be utilized for the NOx filter on the basis that any diminishing delay of the signal is better than none. However, as will be explained, a particularly important feature of the invention is that the NOx filter employs a varying time constant correlated to the capacity of the catalyst to reduce NOx emissions at a given temperature.

NOx calculated filter 90 is a second order filter which is designed to make use of the NH3 storage capabilities of the SCR system at low temperature and to improve urea hydrolysis, as well. The time constant for this second filter is extrapolated from a look-up table correlating the capacity of the catalyst to store reductant at a given temperature as explained further below.

The theory behind the second order NOx filter is as follows. Two considerations are important: a) $NH_3$ storage in the catalyst increases with decreasing catalyst temperature, and b) hydrolysis reaction (urea solution -> $NH_3$ molecules) improves with decreasing space velocity.

Considering actual (engine out NOx block 75) and filtered (NOx filter block 90) NOx signals during a step load cycle, for example, the filtered $NO_x$ signal is smoother. This also leads to a smoother injection profile. When taking-off engine load the filtered signal falls down slower than the actual NOx. At the same time the space velocity is low, so a high NSR value will be taken from the NSR look-up table. This provides the opportunity to inject additional urea under "hydrolysis-friendly" conditions. The additional urea quantity is limited by the storage capacity of the catalyst in turn correlated to the catalyst temperature and space velocity of the exhaust gas. Therefore, a filter dependent on such correlation is introduced.

This filter comprises two first order filters in series with both time constants being a function of the catalyst capacity at any given catalyst functional temperature. In other words the time constants are equal to each other and are variable. The value is obtained from a look-up table which has a functional catalyst temperature as input and from which a time constant related to the capacity of the store reductant at that temperature is established as an output. In the continuous time domain the filter (two first order filters in series) can be represented by the transfer function [ratio of the transform of the output variable $NOx_{Filt}$ (NOx filter block 90) to the transform of the input variable $NOx_{EngOut}$ (engine out NOx block 75)] shown as equation 1:

Equation 1:
$$H_{NOx}(s) = \frac{NOx_{Filt}}{NOx_{EngOut}} = \frac{1}{\tau_{NOx1} \cdot s + 1} \cdot \frac{1}{\tau_{NOx2} \cdot s + 1}$$

and
$$\tau NOx1 = \tau NOx2 = f(Cat)$$

where:
$NOx_{EngOut}$=Predicted engine out NOx (from map, block 75)
$NOx_{Filt}$=Filtered NOx
$\tau_{NOx1}$, $\tau_{NOx2}$=Time constant-function of catalyst temperature correlated to capacity of catalyst to store reductant and NOx
s=differential operator (continuous domain)

note:

"$H_{NOx}(s)$" is a general representation of a transfer function, "H". The "NOx" subscript indicates the process and the "(s)" points out that it is a continuous process. The form "s" should be recognized as a differentiation term which means that the correction to the input occurs only during changing or transient conditions.

However this equation is implemented in a controller which means that this formula has been put in a discreet form, i.e., difference equations. In a discreet form the first, first order filter may be represented by equation 2:

$$NOx_{Filt1}(n) = \frac{NOx_{EngOut}(n) - NOx_{Filt1}(n-1)}{\tau_{NOx1}} + NOx_{Filt1}(n-1) \quad \text{Equation 2}$$

But because two first order filters have been placed in series, the actual filtered NOx value is the result of the second first order filter, which in discreet formula may be represented by difference equation 3:

$$NOx_{Filt2}(n) = \frac{NOx_{Filt1}(n) - NOx_{Filt2}(n-1)}{\tau_{Nox2}} + NOx_{Filt2}(n-1) \quad \text{Equation 3}$$

and
$$\tau NOx1 = \tau NOx2 = f(Cat)$$

where:
$NOx_{EngOut}$=Predicted engine out NOx (block 75);
$NOx_{Filt1}$=NOx value after first filter, intermediate value;
$NOx_{Filt2}$=NOx value after second filter, final filtered NOx value;
$\tau_{NOx1}$, $\tau_{NOx2}$=Time constant, function of catalyst capacity at predicted temperature.

Note:

The subscripts "Filt1" and "Filt2" indicate values of the first or second first order filter. The subscript "(n)" indicates the value of the current sample. The subscript "(n−1)" indicates the value of the previous sample. The output of Equation 2 is substituted for the input in Equation 3. The time interval at which samples n are taken can be arbitrarily set or is a function of the speed of the processor at it completes a loop through the programmed routine. In the preferred embodiment, the time interval at which the algorithm is performed is set near to the operating speed of ECU 60.

Figure 6:
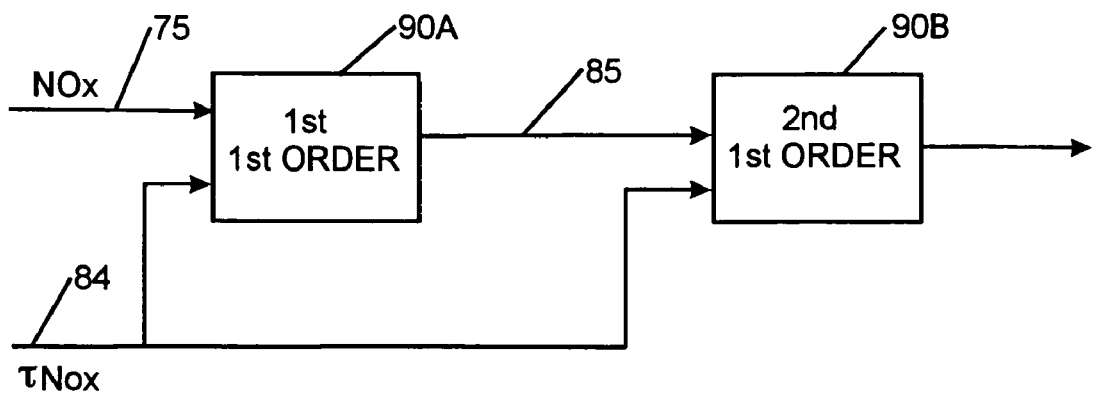
FIG. 6 is a schematic representation of the NOx filter of the present invention in a discrete form.

Reference can be had, by way of further explanation, to FIG. 6 which shows NOx filter block 90 in discrete form comprising a first 1st order filter 90A corresponding to equation 2 and a second 1st order filter 90B corresponding to equation 3. Input to first 1st order filter 90A is the output from engine out NOx block 75 and a time constant shown as τNOx on line 84. Output from first 1st order filter 90A is fed as input on line 85 as is time constant τNOx to second 1st order filter 90B.

Figure 7A:
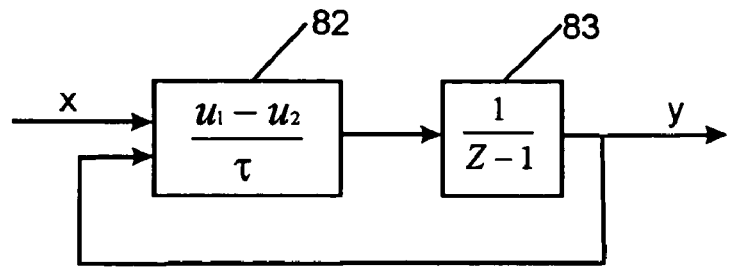
FIGS. 7A and 7B are schematic representations of first order filters suitable for use in the present invention.
Figure 7B:
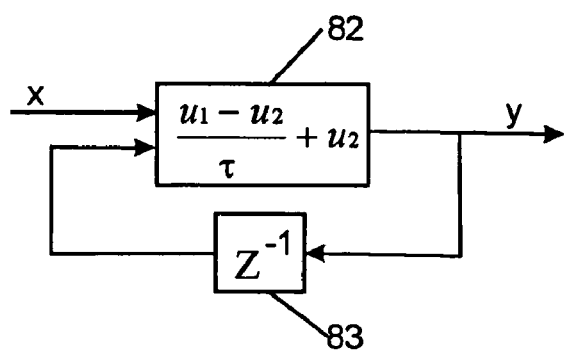
Figure 7C:
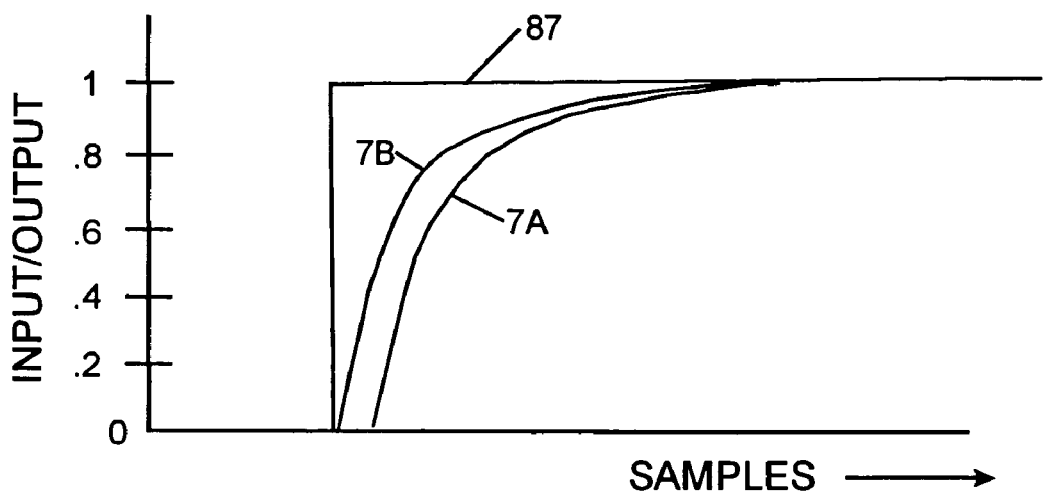
FIG. 7C is a graph depicting the filter effects of the filters shown in FIGS. 7A and 7B.

Those skilled in the art will recognize that the invention in its discrete form is not limited to equations 2 and/or 3 but can encompass any number of conventional first order filters. Reference can be had to FIG. 7A which in schematic form represents a first order filter of the type defined by equations 2 and/or 3. By way of explanation relative to NOx filter 90, input designated "x" in first calculation block 82 is τNOx, τ, and actual emissions from engine out NOx block 75, $\mu_1$. Feedback is $\mu_2$. An integration block 83 performs a conversion factor from the number of samples to time (i.e., seconds). Reference should be had to FIG. 7B which shows an alternate discreet 1st order filter, employing the same terminology and reference numerals. The functioning of both first order filters is generally shown in FIG. 7C in which the input is represented by line designated 87, generally indicative of a step load. The output of 1st order filter shown in FIG. 7A is designated by reference numeral 7A and output of 1st order filter shown in FIG. 7B is designated by reference numeral 7B.

Figure 8:
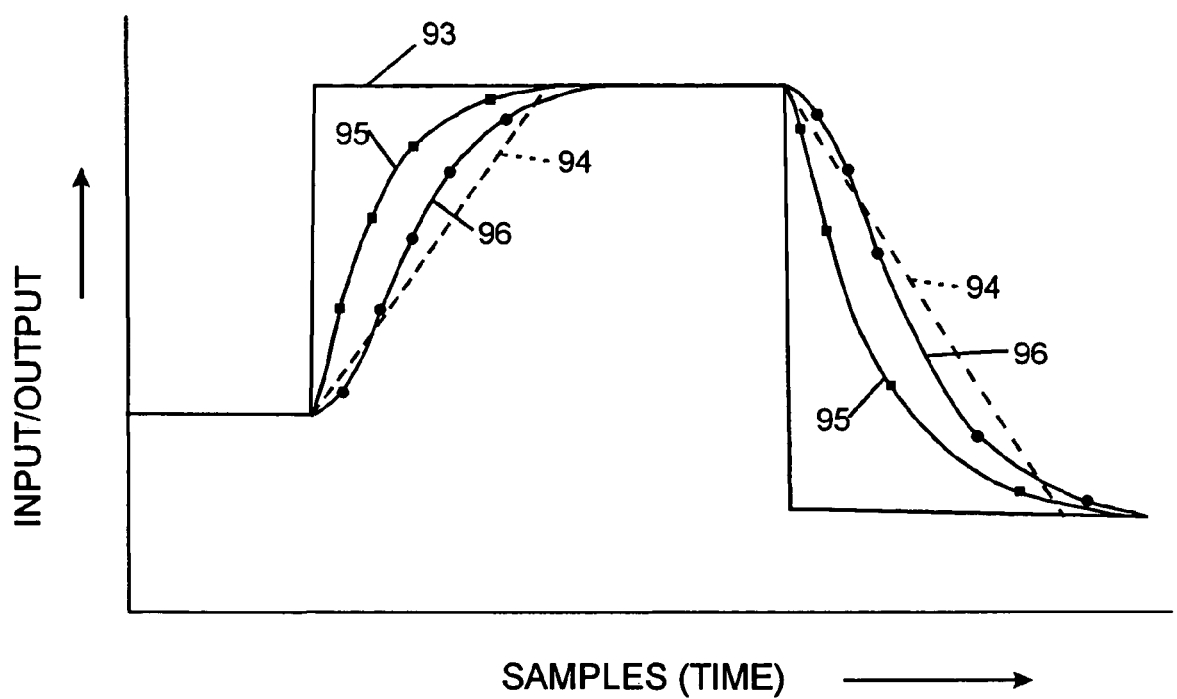
FIG. 8 is a graph depicting the filter effect of the invention on a step load transient emission.

Reference can now be had to FIG. 8 which is an input/output graph depicting the various filter concepts falling within the broader scope of the invention. Limiting discussion to NOx filter 90 (although applicable to Cat filter 92), an input indicative of a step load (discussed with reference to FIG. 2) is shown by the straight line indicated by reference numeral 93. The y-axis can be viewed as NOx concentrations and the x-axis time so input 93 is the actual concentrations of NOx produced by the engine as predicted from look-up maps at engine out block 75. Again, NOx filter block 90 can take, in accordance with broader aspects of the invention, various forms. A filter based on a moving average as discussed above is represented by dash line 94 and clearly shows a change in the concentration of the predicted actual emissions over a lag period which change diminishes over the filter delay period. A first order filter, only, such as shown in FIGS. 7A and 7B is shown by the output curve passing through squares and designated by reference numeral 95. The preferred second order filter is shown by the output curve passing through circles and designated by reference numeral 96. As will be explained below, the NOx time constant for all filters, is determined by a look-up table which establishes, for various temperatures of any specific catalyst, a time constant indicative of the time response of the catalyst to store reductant and NOx emissions as a function of the capacity of the catalyst.

As can be seen in FIG. 8 the load increase and the load decrease is delayed. A delay in adding the reductant at the onset of the transient reduces the likelihood of reductant slip. A delay in recognizing a decrease in NOx emissions results in an increase in reductant but at a condition, i.e., lower exhaust speed and temperature, whereat the hydrolysis reaction is more likely to proceed to completion and the reducing catalyst storage capacity is increased.

Referring still to FIG. 4, a filter is applied to determine the temperature of reducing catalyst 42 in order to account for the changing temperature of the catalyst associated with the NOx transient emission. The exhaust gas velocity on input 98 such as determined by air mass flow or pressure sensor 64 is converted to a current time space velocity at space velocity block 99. Space velocity output as shown is to NSR calculation block 76 per the map as discussed above relative to FIG. 5. However, the space velocity is also used to filter the catalyst temperature.

Conceptually, the catalyst temperature prediction can be effected by use of a running average of a measured exhaust gas which conceptually can be either post or pre catalyst. The number of samples of temperature taken from which the average catalyst temperature would be determined would then depend on the value of the space velocity. The reasoning behind this concept was that with a step load increase or decrease a heat or cold front, respectively, moves through the catalyst. The speed at which this front proceeds through the catalyst is space velocity dependent.

While in accordance with the broader concepts of the invention, a moving average for the catalyst mid-bed temperature can be used (as well as a moving average for calculated NOx emissions with the number of samples, dependent on the storage capacity of the catalyst at its current mid-bed temperature), it is a specific aspect of the invention that a second order filter can be used to predict catalyst temperature because, among other reasons, the second order filter is far more easier to implement than a mathematical technique to determine a moving average over a varying time integral which may be significantly long in duration. Again the implementation includes two first order filters in series with variable time constants. The time constants are a function of the space velocity through the catalyst. In transfer function form, the filter can be defined by equation 4:

$$H_{TCat}(s) = \frac{TCat_{Filt}}{TExhaust} = \frac{1}{\tau_{Cat1} \cdot s + 1} \cdot \frac{1}{\tau_{Cat2} \cdot s + 1} \quad \text{Equation 4}$$

and $$\tau Cat1 = \tau Cat2 = f(SV)$$

where:
$TCat_{Filt}$=Predicted catalyst temperature;
TExhaust=is the measured exhaust gas temperature upstream of the catalyst;
$\tau_{Cat1}, \tau_{Cat2}$=Time constant which is a function of the space velocity;
s=differential operator (continuous domain)

note:

"$H_{TCat}(s)$" is a general representation of a transfer function, "H". The "TCat" subscript indicates the process and the "(s)" points out that it is a continuous process. Again, the form "s" should be recognized as a differentiation term which means that the correction to the input occurs only during changing or transient conditions.

Again this equation is implemented in a controller which means that this formula has been put in a discreet form. In a discreet form the first, first order filter may be defined by equation 5:

$$TCat_{Filt1}(n) = \frac{TExhaust(n) - TCat_{Filt1}(n-1)}{\tau_{Cat1}} + TCat_{Filt1}(n-1) \quad \text{Equation 5}$$

But because two first order filters have been placed in series in order to create a second order filter, the actual filtered catalyst temperature is the result of the second first order filter, as shown by discreet or difference equation 6:

$$TCat_{Filt2}(n) = \frac{TCat_{Filt1}(n) - TCat_{Filt2}(n-1)}{\tau_{Cat2}} + TCat_{Filt2}(n-1) \quad \text{Equation 6}$$

and $$\tau Cat1 = \tau Cat2 = f(SV)$$

where:
TExhaust=Measured exhaust temperature upstream of the catalyst;
$TCat_{Filt1}$=Catalyst temperature after first filter, intermediate temperature;
$TCat_{Filt2}$=Predicted catalyst temperature, final filtered temperature;

$\tau_{Cat1}$, $\tau_{Cat2}$=Time constant which is a function of the space velocity.

note:

The subscripts "Filt1" and "Filt2" indicate values of the first or second first order filter. The subscript "(n)" indicates the value of the current sample. The subscript "(n−1)" indicates the value of the previous sample.

The time constant for the catalyst, τCAT, is constantly varying (straight line) indicated schematically by the graph shown in FIG. 4 designated by reference numeral 97 and generally determined in accordance with equation 8 as follows:

$$\tau_{CAT} = \frac{M_{CAT} \cdot Cp_{CAT}}{SV \cdot P_{GAS} \cdot Cp_{GAS} \cdot V_{CAT}} \qquad \text{Equation 7}$$

where
M is the mass of the catalyst;
V is the volume of the catalyst;
$Cp_{CAT}$ is the heat capacity of the catalyst;
$P_{GAS}$ is the density of exhaust gas;
$Cp_{GAS}$ is the heat capacity of the exhaust gas; and,
SV is the space velocity of exhaust gas.

Equations 6 and 7 provide a method to determine in real time the temperature of the reducing catalyst accounting for the temperature change attributed to NOx transient emissions.

While it is a necessary element of the present invention, the determination of the catalyst temperature by a filter using a space velocity time constant, τCat, may be used in other emission control systems or for other emission related functions. Although a thermocouple can directly measure temperature, the life of a thermocouple in a vehicular environment is limited. More importantly, a moving heat wave front(s) resulting from a NOx transient emission(s) does not uniformly dissipate its heat to the catalyst bed. A precise position can not be established for all the transients whereat a maxima or average heat front will occur. Generally, a mid-bed temperature is necessary to establish an accurate NSR but the wave front position is variable and not strictly speaking at the exact mid-point of the catalyst. While inlet and outlet exhaust gas temperature sensors 67, 68 can give readings with difference divided by a constant, i.e., two, to give a mid-bed approximation, significantly more accurate results are obtained if the catalyst temperature (½ the sum of inlet and outlet temperatures) is filtered by the τCat constant to account for the changing nature of the heat wave front passing through the catalyst. In fact, τCat has been found to accurately predict catalyst temperatures using only the exhaust temperature at inlet sensor 67 or exhaust manifold sensor 65 (or even a modeled exhaust gas temperature from ECU 60). As used herein and in the claims, reference to catalyst functional or functioning temperatures means the mean or median temperature of the reducing catalyst bed. The catalyst filter using a τCat constant to modify precatalyst exhaust gas temperature produces a more accurate functional catalyst temperature accounting for transient emission heat wave fronts than other known methods. In support of this, reference should be had to FIG. 9 which is a graph of catalyst temperatures taken during an ETC (European transient cycle) test. The trace passing through diamonds and designated by reference numeral 87 is the average catalyst temperature recorded by inlet and outlet sensors 67, 68. It should be recalled that FIG. 2B (and 2A) plotted the inlet and outlet temperatures separately. The inlet temperature oscillated significantly and the outlet temperature was "damped". Neither inlet nor inlet temperature readings can account for the catalyst temperature when affected by transient emissions. Average catalyst temperature trace 87, as expected, dampens the inlet temperature oscillations. However, the oscillations are still present and demonstrate why actual temperature measurements are not suitable for a reductant metering system. The mid-bed temperature was measured during the ETC test and is plotted as the trace passing through squares designated by reference numeral 88 in FIG. 7. The mid-bed temperature does not have the oscillations associated with the exhaust gas, and as expected, has a wave form shape. The predicted temperature, determined by τCat, is shown by the trace passing through circles designated by reference numeral 89. The predicted temperature was based on sensing exhaust gas temperature only. Predicted temperature trace 89 follows mid-bed temperature trace 88 and clearly demonstrates why it is a superior tool, easily implemented in any control system without intensive heat transfer calculations to determine the functional catalyst temperature.

Figure 10:
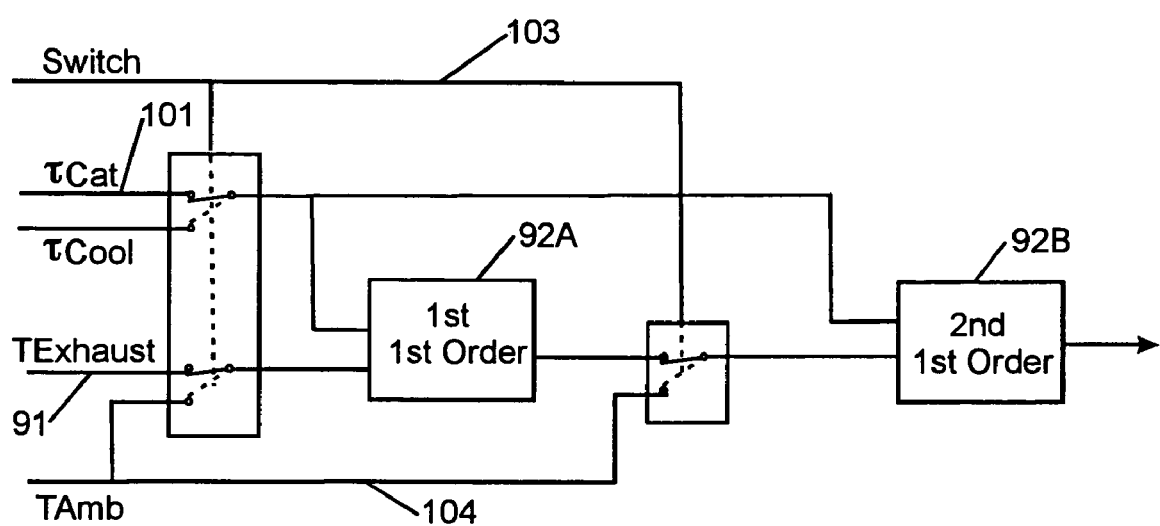
FIG. 10 is a schematic representation of the TCat filter of the present invention in a discrete form.

A particularly novel feature of this filter is that during a short engine stop the filter predicts the catalyst temperature according to the cooling down process. This is done by splitting the two first order filters in series into two individual parallel operating first order filters and feeding the ambient temperature into both filters as input. The output of the filters represents the predicted catalyst temperature. The reason that the combined filters are split is because a cooling down curve of a catalyst can be represented very well by a first order filter with a variable time constant. The time constant is computed from a look-up table which has as input, e.g., a timer or the difference in predicted catalyst temperature and ambient temperature. The transfer function in continuous form for this filter is represented by equation 8:

$$H\tau_{Cool}(s) = \frac{T_{Cool}}{T_{Amb}} = \frac{1}{\tau_{Cool1,2} \cdot s + 1} \qquad \text{Equation 8}$$

and

τCool1=τCool2=f(Timer)

where:
TAmb=Ambient temperature
TCool=Catalyst temperature while cooling down
$\tau_{Cool1}$, $\tau_{Cool2}$=Time constant which is a function of time, e.g., timer or temperature difference Reference should be had to FIG. 10 which shows in schematic, conceptual form, how the cool down filter can be implemented in Cat filter block 92. A switching arrangement is shown to switch the filters from a series arrangement to a parallel arrangement. The filter is shown switched into its series arrangement and operates with τCat and exhaust gas temperature inputs to the first 1st order filter 92A and then to the second 1st order filter 92B in the same manner as explained with reference to FIG. 6. On engine shut down, switch line 103 actuates the switches to the position shown by the dotted lines. Switching inputs τCool and ambient temperature on line 104 to second 1st order filter 92B to predict the cool down temperature of the catalyst used upon engine restart.

The reason for feeding the second parallel placed filter with the same information as well is to keep this filter (i.e., first 1st order filter 92A) from freezing or drifting to faulty values when the engine is started again after a short stop. On restart, the filters are connected again in series and both have to start from the same values in order to predict accurately the catalyst temperature again based on the measured value.

The advantage of using the temperature difference between computed catalyst temperature and ambient temperature for determination of the time constant is that no counters are required which have to have a capacity for dealing with "large" times.

This feature is not only very useful during testing but also in practice when a vehicle has made a short stop (refueling, etc.). The software is not starting from a default (reset) value. Starting from a default value while the catalyst is hot means that urea is not injected at the earliest possible moment, which means lower conversions.

The above representation of the catalyst temperature filters is for the continuous domain. However they are implemented in discreet form in the controller by difference equation 9 as follows:

$$TCool_{Filt1,2} = \frac{TAmb(n) - TCool_{Filt1,2}(n-1)}{\tau_{Cool1,2}} + TCool_{Filt1,2}(n-1) \quad \text{Equation 9}$$

and $$\tau Cool1 = \tau Cool2 = f(Timer)$$

where:
TAmb=Ambient temperature;
$TCool_{Filt1,2}$=Predicted catalyst temperature while cooling down, both filters;
$\tau_{Cool1} = \tau_{Cool2}$=Time constant which is a function of e.g. timer or temperature difference note:

The subscript "Filt1,2" indicate values of parallel operating first and second first order filter. The subscript "(n)" indicates the value of the current sample. The subscript "(n-1)" indicates the value of the previous sample.

It is to be appreciated that the use of a first order filter to predict the cool down temperature of the catalyst after engine shut-off is a feature that can be implemented in any emission system whether or not a functional catalyst temperature is obtained by the invention. In such application only a first order filter is used to generate a cool down temperature of the catalyst and the cool down temperature can be used for any purpose needed by the system. The cooled own time constant, τCool, would still be generated by a look-up table either a timing constant based on catalyst temperature on shut down or a table based on the difference between catalyst temperature at shut down compared to ambient temperature. The catalyst temperature would be the temperature calculated by the system using the cool down filter. In its broader inventive scope, the cool down filter is not limited to a reducing catalyst. For example, a hybrid vehicle employing an engine which intermittently shuts off and on, could use a catalyst temperature for fueling control which can be easily attained by the first order cool down filter.

The NOx filter constant, τNOx, is specific to the reducing catalyst used in the SCR system. It is determined as a function of the ability of any specific reducing catalyst to store (and release) reductant at any given temperature (within the reductant storage temperature range of the reducing catalyst). Preferably, the NOx filter constant is determined as a function of the ability of any specific reducing catalyst to store the external reductant and NOx emissions (within the catalyst temperature range).

Figure 11:
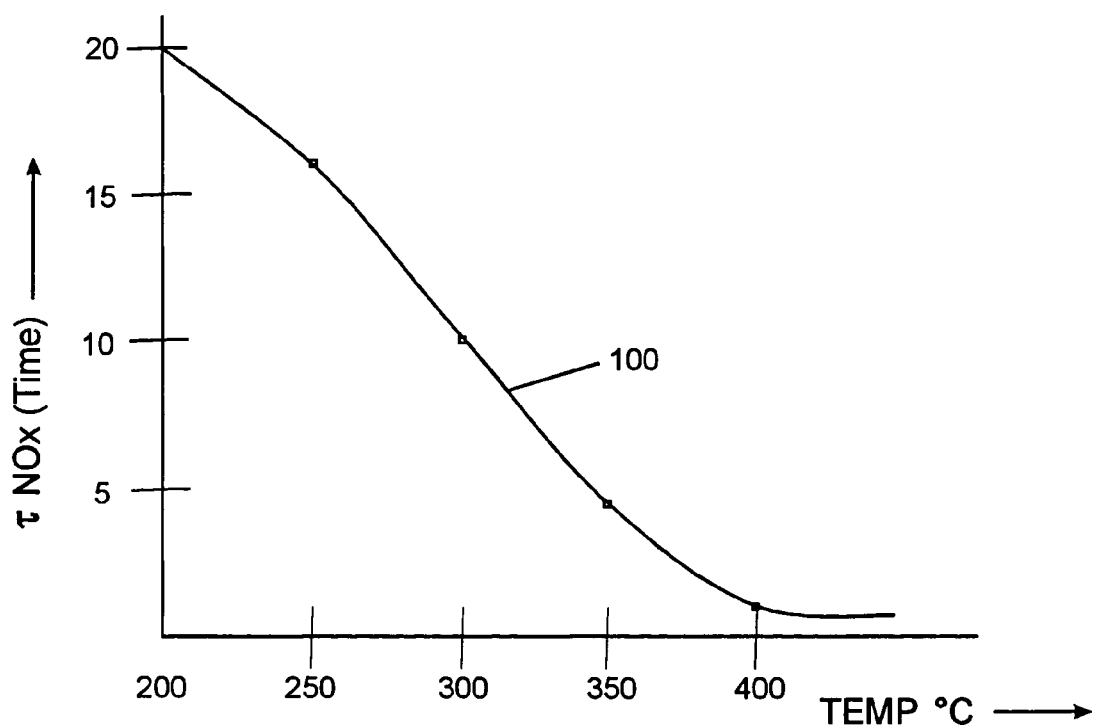
FIG. 11 is a constructed graph indicative of the variable NOx constant used in the present invention, i.e., τNOx; and, FIG. 12 is a graph of a portion of an ETC cycle showing ammonia slip for systems which metered the reductant based on actual NOx emissions compared to a system using the present invention.

Reference should be had to FIG. 11 which is a graph of the τNOx time constant for various functional catalyst temperatures (as determined from Cat filter block 92) of a specific reducing catalyst 42. Catalyst functional temperature is plotted on the x-axis and τNOx is plotted as a time constant on the y-axis. The plotted time constant was established through a series of tests. The catalyst was purged of any reductant and heated to a temperature within the known catalyst storage range (about 200 to 400° C.). An inert gas with a set concentration of reductant was metered through the catalyst and gas samples taken at time increments. When the gas samples showed a reductant concentration approximately equal to that metered into the reducing catalyst, a storage time was established and plotted on the y-axis for that temperature. The resulting plot designated by reference numeral 100 is then stored in a look-up table within ECU 60. What this procedure did was to relate the storage capacity of the catalyst to a time period which time period varies with the temperature of the catalyst and is used to set the time constant τNOx for the NOx filter.

The time period while relative in the sense of an absolute time quantity affords a consistent basis for establishing the time constant for all catalysts because a catalyst having a greater capacity to store reductant than another catalyst will, for any given temperature, take a longer time before it stops storing reductant (metered at a set concentration rate) than a catalyst having less storage capacity. By correlating the catalyst storage capacity to a storage time, a basis exists for determining the timeliness of the catalyst to react to changes in NOx emission concentrations. All that is needed is to determine the change in emissions because the catalyst behavior in response to the change can be predicted. The control system does not have to monitor operating parameters to ascertain how the catalyst is responding in real time to the changes nor perform any number of intensive calculations based on the catalyst response (in the end correlated to the capacity of the catalyst) to adjust the reductant dosage.

While sufficient tests have not been conducted as of the date of this application, it is believed that data taken from a number of τNOx curves generated from different reducing catalysts will establish a correlation between the number and strength of storage/release sites on the surface area of the reducing catalyst and the τNOx curve for that specific reducing catalyst. In the preferred ammonia reductant embodiment, the reducing catalyst can be formulated to produce, per unit area, a mean number of Bronsted acid sites having a mean bond strength at which ammonia molecules attach. The τNOx curve is then generated for the formulated washcoat with known reactivity on the basis of the surface area of the catalyst i.e., the larger the surface area, the longer time or larger τNOx constants. Because the τNOx curve is selected to match the transient emissions generated by any given engine, a method for determining catalyst sizing matched to a specific engine is established. Catalyst cost is minimized while NOx regulations are met.

It is also known that reducing catalysts (particularly zeolites) similarly have a varying affinity to store (and release) NOx emissions depending on the temperature of the catalysts. The invention contemplates producing a more accurate τNOx constant by accounting for the NOx storage capacity of the reducing catalyst in a manner similar to that explained above which determined and measured the reductant storage capacity of the reducing catalyst. The τNOx constant is thus established on the capacity of any given reducing catalyst to store the reductant and NOx.

The inventive method as thus described senses exhaust gas velocity at input 98 to produce a space velocity signal at space velocity block 99 which is inputted to NSR block 76. Space velocity signal is also used to access a catalyst time constant in τCat look up table 101 which time constant is inputted to Cat filter block 92 to generate a functional catalyst temperature, adjusted for NOx transients, which is inputted to NSR block 76 for determining a NSR ratio pursuant to the map of FIG. 5. The catalyst temperature is also used to access a NOx time constant, in a τNOx look up table 102, which is inputted to NOx filter block 90 to generate a calculated NOx emission concentration which accounts for the transient NOx emissions produced by engine 32. The NSR ratio and calculated or filtered NOx emissions are inputted to Reductant calc block 77 which determine the concentration of reductant to be injected upstream of reducing catalyst 42 at injection block 78 which controls pulse metering of the reductant. Note that all major system components, NOx, temperature, NSR and reductant calculation have all been adjusted for the effects attributed to transient emissions.

It should be apparent that the inventive system, is matching the delay experienced in real life from sudden changes in engine operating conditions on the ability of the reducing catalyst to reduce NOx emissions by delaying the impact of the NOx emissions which would otherwise be sensed and used to control reductant metering. The delay is a relative but consistent number, τNox, in the sense that it is based on the relative ability of the catalyst to reduce NOx emissions (i.e., storage capacity) at varying temperatures. Further the catalyst temperature is a real time prediction based on the delay of the catalyst to experience the changing exhaust gas wave front. The metering is set in accordance with a varying NSR (predicted current functional catalyst temperature and current space velocity). The system thus accounts for transient emissions by emulating the effects of the transient emission, temperature and NOx, without any attempt to measure catalyst performance followed by an adjustment of reductant metering rate such as disclosed, for example, in the '186 patent.

As described, the control system is fully functional. There are however several enhancements, additions or modifications which can be made to the control system to improve its overall operation. In particular a rate of temperature change control shown as dT/dt block 110 can be incorporated into the system. While the algorithms discussed above inherently account for increasing/decreasing values in the sense of positive and negative numbers, a time derivative of catalyst temperature can establish, over longer time periods, a decreasing or increasing temperature change attributed to NOx transients. When and depending on the rate of temperature change determined by dT/dt block 110, a variable constant can be applied to the τNOx constant on a decrease in temperature rate allowing asymmetric τNOx constants for increasing and decreasing NOx emission rates. Further, dT/dt block 110 can sense a deceleration and stop reductant metering at block 77 when a deceleration occurs. In this regard, it should be recognized that when the catalyst temperature is below the catalyst range (i.e., less than 150° C.) there is no reductant metering. There is no reductant metering upon a vehicle deceleration. Also, when the catalyst temperature is above the catalyst temperature range (i.e. greater than about 400° C.), the reductant is metered at a rate equal to the actual NOx emissions produced as determined by engine out NOx block 75. At such higher temperature the NOx time constant, τNOx, has a value of 1. Again, it is to be noted that the NOx filter is operating during changing conditions within a set temperature range whereat the catalyst has ability to store reductant. The fact that the filtered NOx emissions used to set reductant dosage in this range may, on acceleration, be less than engine but emissions has no bearing on the reduction of the NOx transient but has a bearing on reductant slip.

The system can also account for catalyst ageing by inputting an ageing factor at input 111 to the NSR signal generated at NSR block 76. The ageing signal may be accessed from a look up table which correlates either engine hours of operation or miles driven taken from vehicle sensors to an ageing factor which modifies the NSR ratio.

If time responsive, commercially acceptable NOx sensors are developed suitable for vehicle application, these NOx sensors would be used in place of steady state engine maps to determine the actual concentration of NOx emissions at engine out NOx block 75. If time responsive, commercially acceptable reductant, i.e., ammonia, sensors are developed, these sensors would be used to trim the reductant signal at reductant calculation block 77.

The system can also include provision for on board diagnostics (OBD) which can be implemented, for example, by a NOx or reductant sensor downstream of reducing catalyst 42. As discussed above, current NOx and/or ammonia sensors do not have adequate response times for control of a mobile IC application. They are satisfactory for diagnostic purposes however.

Figure 12:
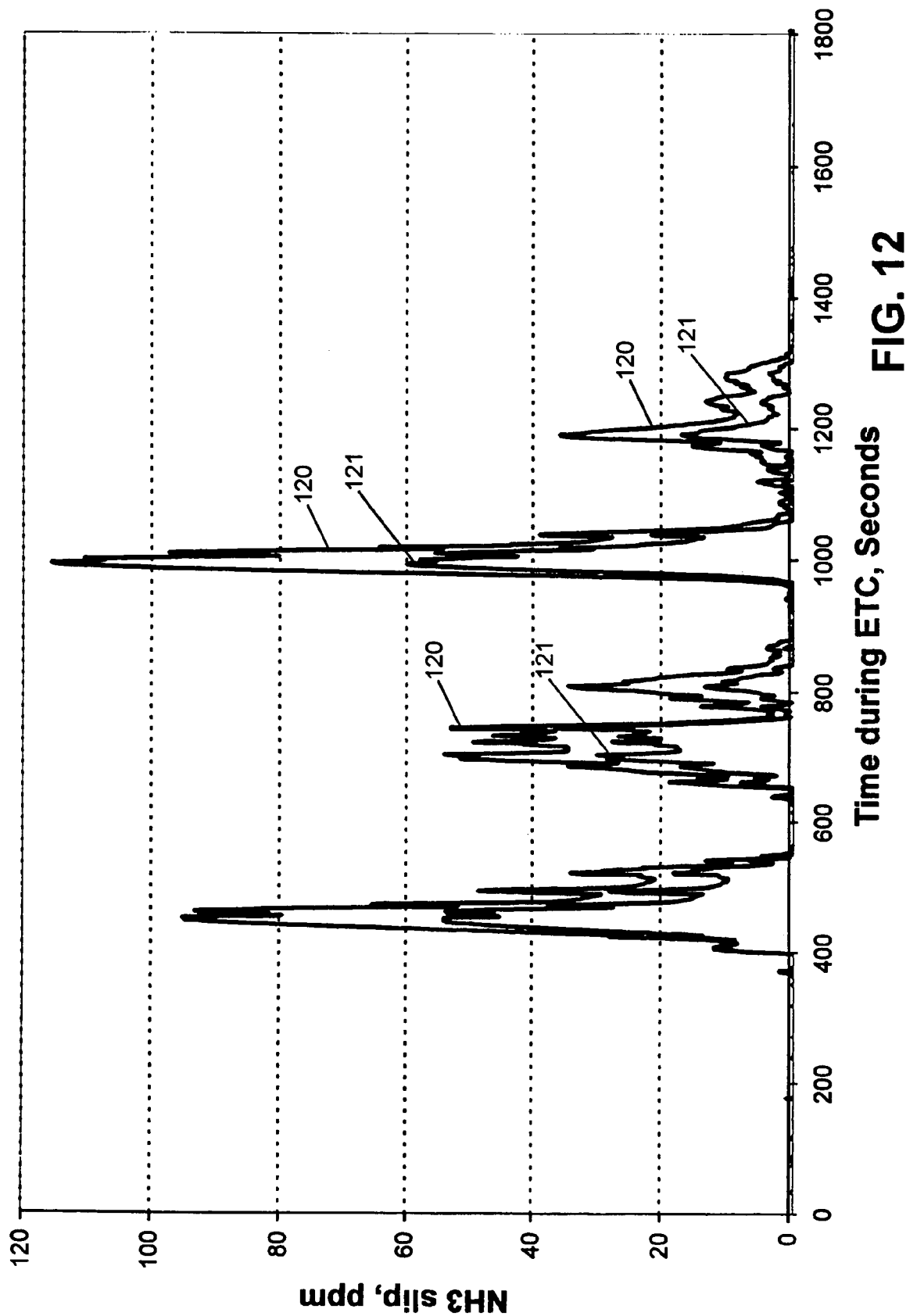

Reference can be made to FIG. 12 which shows two traces of reductant slip (ammonia) recorded over an ETC drive cycle with the reductant metered to the SCR system with and without the control system of the present invention. Examination of FIG. 12 shows that contained within an outer trace 120 is an inner trace 121. Outer trace 120 represents a conventional metering control referred to as "NOx following" in describing FIG. 2A, i.e., reductant metered on the basis of actual predicted actual NOx emissions emitted by the engine as determined by steady state NOx emission maps from engine operating parameters and catalyst temperature. The inner trace 121 plots the reductant slip when the same engine is operated under the control system for the ETC cycle. In all cases the reductant slip is reduced for transient emissions. In the tests conducted when data for inner trace 121 was gathered, the system was not equipped with the dT/dt differential temperature change block 110 to determine decelerations. Based on a review of the slip data it is believed that if dT/dt block 110 was implemented in the control to stop reductant metering during vehicle decelerations, a further significant reduction in slip would occur.

The invention has been described with reference to a preferred and alternative embodiments of the invention. Modifications and alterations to the invention will occur to those skilled in the art upon reading and understanding the Detailed Description of the Invention set forth herein. It is intended to include all such modifications and alterations insofar as they come within the scope of the present invention.

Having thus defined the invention, it is claimed:

1. A method for controlling dosage of an external reductant supplied to an SCR system including a reducing catalyst, in a mobile application having an IC engine to account for transient NOx emissions produced by the engine, said method comprising the steps of:

a) determining the actual NOx emissions produced by the engine to generate an NOx actual signal;

b) filtering the NOx actual signal when the reducing catalyst is within a set temperature change to produce a variable delay in the NOx actual signal; and c) metering the reductant in real time at the value of the delayed NOx actual signal.

2. The method of claim 1 where the filtering step is effected by an NOx filter having an NOx time constant determined as a function of the capacity of the reducing catalyst at the temperature of the catalyst.

3. The method of claim 2 wherein said time constant is a variable correlated to the time any given catalyst can store and/or release a given quantity of reductant at a given catalyst temperature within said set catalyst temperature range, said storage time decreasing as said catalyst temperature increases within said set temperature range.

4. The method of claim 2 wherein said NOx filter in a continuous time domain filters the actual concentration of NOx emissions in accordance with the transfer function $$H(s) = \frac{1}{\tau_1 \cdot s + 1} \cdot \frac{1}{\tau_2 \cdot s + 1}$$

where $\tau_1$ equals $\tau_2$ and is a function of the operation of said reducing catalyst.

5. The method of claim 4 wherein said NOx filter is in discreet form and implemented by a microprocessor, said NOx filter in said discrete form including two first order filters in series with one another.

6. The method of claim 5 wherein the first NOx filter in discrete form is represented by diffeence equation $$NOx_{Filt1}(n) = \frac{NOx_{EngOut}(n) - NOx_{Filt1}(n-1)}{\tau_{NOx1}} + NOx_{Filt1}(n-1)$$

and the second NOx filter in discrete form is represented by difference equation $$NOx_{Filt2}(n) = \frac{NOx_{Filt1}(n) - NOx_{Filt2}(n-1)}{\tau_{NOx2}} + NOx_{Filt2}(n-1)$$

where $\tau_{NOx1}$ equals $\tau_{NOx2}$; $NOx_{EngOut}$ is said actual NOx emissions; $NOx_{Filt1}$ is the NOx value after said first filter and is an intermediate value, and $NOx_{filt2}$ is said calculated NOx emissions.

7. The method of claim 6 further including the step of determining the temperature of said reducing catalyst by sensing or calculating the temperature of the exhaust gas and filtering the temperature of the exhaust gas by a catalyst filter when the space velocity of the exhaust gas changes to establish a functional catalyst temperature.

8. The method of claim 7 wherein said catalyst filter in the continuous time domain is represented by the transfer function.

$$H(s) = \frac{1}{\tau_1 \cdot s + 1} \cdot \frac{1}{\tau_2 \cdot s + 1}$$

where $\tau_1$ equals $\tau_2$ and is a function of the space velocity of the exhaust gases.

9. The method of claim 8 wherein said catalyst filter is in discreet form and implemented by a microprocessor, said filter in said discrete form including two first order filters in series with one another.

10. The method of claim 9 wherein the first catalyst filter in discrete form is represented by difference equation $$TCat_{Filt1}(n) = \frac{TExhaust(n) - TCat_{Filt1}(n-1)}{\tau_{Cat1}} + TCat_{Filt1}(n-1)$$

and the second catalyst filter in discrete form is represented by difference equation $$TCat_{Filt2}(n) = \frac{TCat_{Filt1}(n) - TCat_{Filt2}(n-1)}{\tau_{Cat2}} + TCat_{Filt2}(n-1)$$

where $\tau_{CAT1}$ equals $\tau_{CAT2}$; TExhaust is said exhaust gas temperature; $TCat_{Filt1}$ is the catalyst temperature after first filter, intermediate temperature and $TCat_{Filt2}$ is said functional catalyst temperature.

11. The method of claim 10 wherein $$\tau_{CAT} = \frac{M_{CAT} \cdot Cp_{CAT}}{SV \cdot P_{GAS} \cdot Cp_{GAS} \cdot V_{CAT}}$$

where

M is the mass of the catalyst;
V is the volume of the catalyst;
$Cp_{CAT}$ is the heat capacity of the catalyst;
$P_{GAS}$ is the density of exhaust gas;
$Cp_{GAS}$ is the heat capacity of the exhaust gas; and,
SV is the space velocity of exhaust gas.

12. The method of claim 1 further including the steps of sensing ambient temperature after shut down of the engine and filtering the catalyst temperature by a first order filter using a cool down time constant established as a function of time elapsed from engine shut down at any given catalyst temperature at shut down or as a function of the difference in temperature between ambient temperature and catalyst shut down temperature whereby the catalyst temperatute upon engine restart is determined.

* * * * *